(12) United States Patent
Nishikawa et al.

(10) Patent No.: US 6,420,964 B1
(45) Date of Patent: Jul. 16, 2002

(54) INFORMATIONAL OUTLET AND LINES COLLECTION MODULE

(75) Inventors: Yoshikane Nishikawa, Neyagawa; Tetsuya Wada, Suita; Taku Matsuda, Katano; Michinori Masuda, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/536,313

(22) Filed: Mar. 27, 2000

(30) Foreign Application Priority Data

| Mar. 25, 1999 | (JP) | ............................................ 11-081810 |
| Jul. 26, 1999 | (JP) | ............................................ 11-211265 |
| Sep. 7, 1999 | (JP) | ............................................ 11-252396 |

(51) Int. Cl.[7] ............................................. H04M 11/04
(52) U.S. Cl. .................. 340/310.08; 340/826; 340/827; 439/159; 439/535
(58) Field of Search ........................... 340/310.08, 826, 340/827; 370/351; 361/600; 455/6.1; 174/50, 17 R, 58, 59; 220/4.02; 379/439, 312, 332; 439/535, 536, 159, 607

(56) References Cited

U.S. PATENT DOCUMENTS

| 4,863,398 A | * | 9/1989 | Steenton et al. ............. 439/538 |
| 4,918,688 A | * | 4/1990 | Krause et al. ................ 370/76 |
| 5,036,168 A | * | 7/1991 | Kikuchi et al. ............. 200/5 R |
| 5,125,852 A | * | 6/1992 | Acher .......................... 439/555 |
| 5,599,190 A | * | 2/1997 | Willette ......................... 439/49 |
| 5,613,874 A | * | 3/1997 | Orlando et al. ............. 439/491 |
| 5,658,166 A | * | 8/1997 | Freeman et al. ......... 439/540.1 |
| 5,695,361 A | * | 12/1997 | Elisei .......................... 439/535 |
| 5,831,802 A | * | 11/1998 | Ahmed et al. ................. 361/1 |
| 6,039,578 A | * | 3/2000 | Suffi et al. ..................... 439/54 |
| 6,067,014 A | * | 5/2000 | Wilson ........................ 340/540 |
| 6,104,921 A | * | 8/2000 | Cosley et al. ............... 455/349 |
| 6,114,632 A | * | 9/2000 | Planas, Sr. et al. ...... 174/117 R |
| 6,123,577 A | * | 9/2000 | Contois et al. ............. 439/535 |
| 6,175,556 B1 | * | 1/2001 | Allen, Jr. et al. ........... 370/293 |
| 6,227,879 B1 | * | 5/2001 | Dong .......................... 439/92 |

FOREIGN PATENT DOCUMENTS

| JP | 10-41032 | 2/1998 |
| JP | 10-208827 | 8/1998 |

* cited by examiner

*Primary Examiner*—Daniel J. Wu
*Assistant Examiner*—Phung T Nguyen
(74) *Attorney, Agent, or Firm*—Ratner & Prestia

(57) ABSTRACT

An informational outlet has an outlet frame body having a wiring holder for connecting the informational wiring installed in a wall face; and an information exchange section having the first connector provided in the room side for connecting the informational wiring of an informational terminal, and for performing the transit, exchange, or processing of information between the informational wiring in the wall face and said informational wiring of said informational terminal.

8 Claims, 21 Drawing Sheets

Rear view

Front view
(information exchange section is removed)

Cross section view

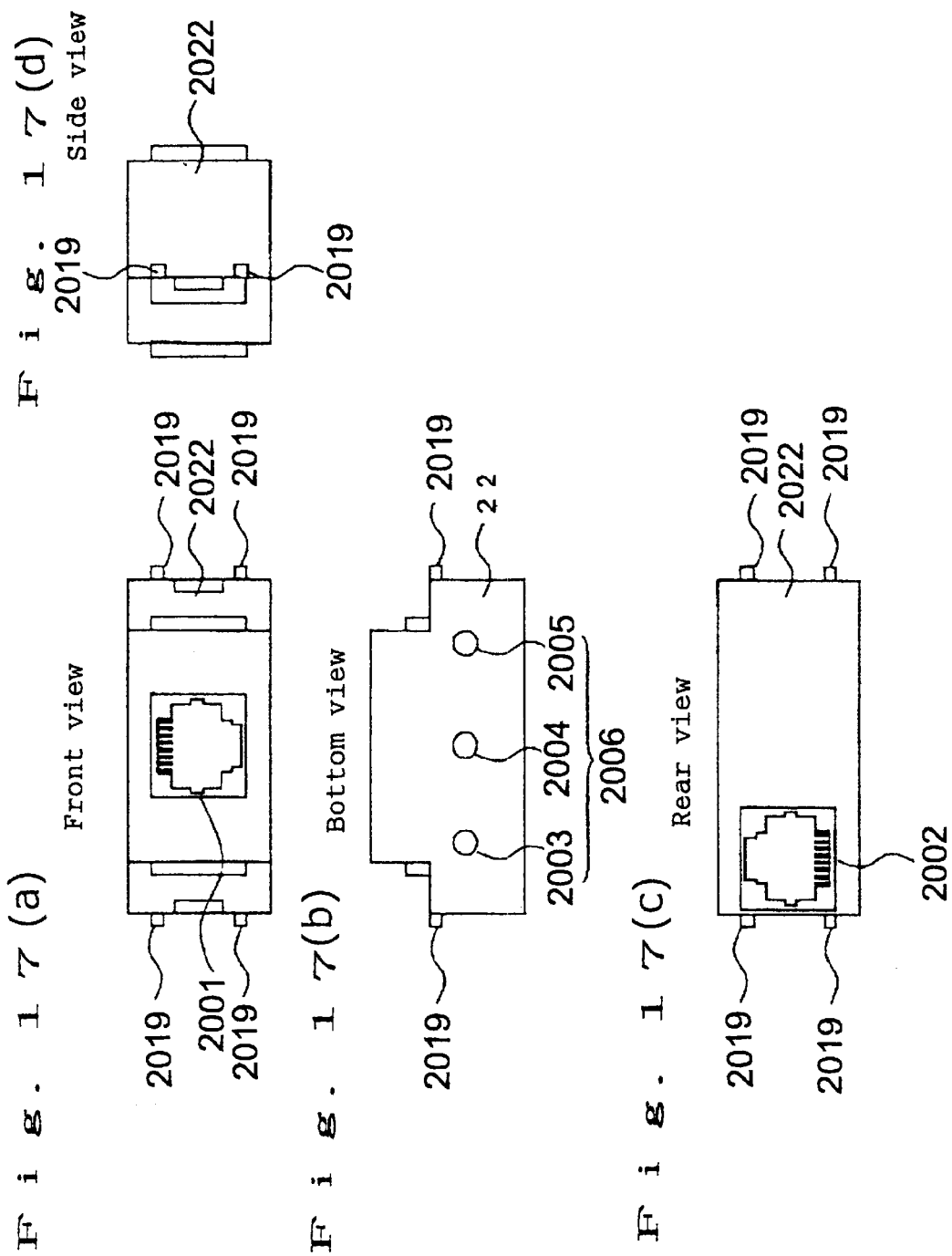

See-through illustration from above

See-through illustration from below

INFORMATIONAL OUTLET AND LINES COLLECTION MODULE

TECHNICAL FIELD

The present invention relates to an informational outlet used for informational wiring indoors, in offices and residences.

Further, the present invention relates to a lines collection device which allows communication among a plurality of informational terminals.

BACKGROUND ART

In the prior art, in order to extract an informational wiring from a wall for transmitting character, audio, and video signals or similar into a plurality of terminal devices or similar for informational communication within offices and so on, a network lines collection device (lines collection device, below) provided with an informational outlet and having hub function or similar has been used.

With regard to such an informational outlet, one described in Japanese Laid-open Patent Publication No. Hei 10-208827 is known, and with regard to the lines collection device, one described in Japanese Laid-open Patent Publication No. Hei 10-41032 is known.

Prior art embodiment is shown in FIG. 16, and in FIG. 16, numeral 1055 is a lines collection device, 1056 is a connection cable D, 1057 is an informational outlet A, and 1058 is an informational outlet B.

In FIG. 16, the informational outlet A 1057 and the informational outlet B 1058 are prior art informational outlets such as one described in said Japanese Laid-open Patent Publication No. Hei 10-208827, and similarly, the lines collection device 56 [sic: 1055] is a prior art lines collection device such as one described in said Japanese Laid-open Patent Publication No. Hei 10-41032.

In such configuration, however, when communication is attempted between the informational terminal A 1045 in a room A 1101 partitioned by a wall 1103 and the informational terminal B 1050, informational terminal C 1051 both in a room B 1102, the lines collection device 1055 and the connection cable D 1056 become necessary in addition to the informational outlet B 1058, whereby the cables more than the number of informational terminals are required, thereby resulting more cost.

The increase in the number of cables, in particular, not only spoils the beauty and makes the wiring disordered or annoying, but also electrically causes an increase in noise generation sources or an increase in operational failure factors due to the noise of informational terminals.

SUMMARY OF THE INVENTION

An object of the first present invention is to provide an informational outlet that allows digital AV communication at a high speed of the order of Mbps, for example, on Ethernet or IEEE 1394-1995 by utilization of telephone wiring widely spread presently in Japanese homes or by utilization of the informational wiring in bus type topology used in ISDN wiring the most widely spread as a digital communication method.

An object of the first present invention is to provide an informational outlet comprising:

an outlet frame body having a wiring holder for connecting the informational wiring installed in a wall face; and an information exchange section having the first connector provided in the room side for connecting the informational wiring of an informational terminal, and for performing the transit, exchange, or processing of information between the informational wiring in the wall face and said informational wiring of said informational terminal.

An object of the second present invention is to provide an active informational outlet which permits a plurality of informational terminals to be connected in orderly wiring.

For this purpose, the second present invention provides an informational outlet consisting of: the first port connected to an informational terminal located in a room, for example, of an office or an residence; the second port connected to a transmission line within the wall; a control board for controlling the first port and the second port; and a power source board for obtaining the power source necessary for the control board from commercial-line AC power source; said control board having a control section, a clock section, a reset section, a power source supplied section, and a filter section; and said power source board having an AC supply section, a power source supply section, and an AC/DC conversion section.

An object of the third present invention is to provide a lines collection module and an informational outlet which realize the communication between informational terminals across the rooms using the wiring without large expense or spoiling the beauty.

For this purpose, the third present invention provides, in a lines collection device allowing the communication among a plurality of informational terminals, a lines collection module comprising: the first port connecting to an informational terminal; the second port connecting to transition wiring or another informational terminal; and a power source supply terminal having the three terminals of a DC(+) supply terminal, a DC (−) supply terminal, and a frame ground terminal.

BRIEF DESCRIPTION OF THE DRAWINGS

FIG. 17 shows:
(a) a front view of a lines collection module according to Embodiment 7 of the third present invention;
(b) a bottom view of a lines collection module according to Embodiment 7 of the third present invention;
(c) a rear view of a lines collection module according to Embodiment 7 of the third present invention; and
(d) a side view of a lines collection module according to Embodiment 7 of the third present invention.

DESCRIPTION OF REFERENCE NUMERALS

Figure 1:
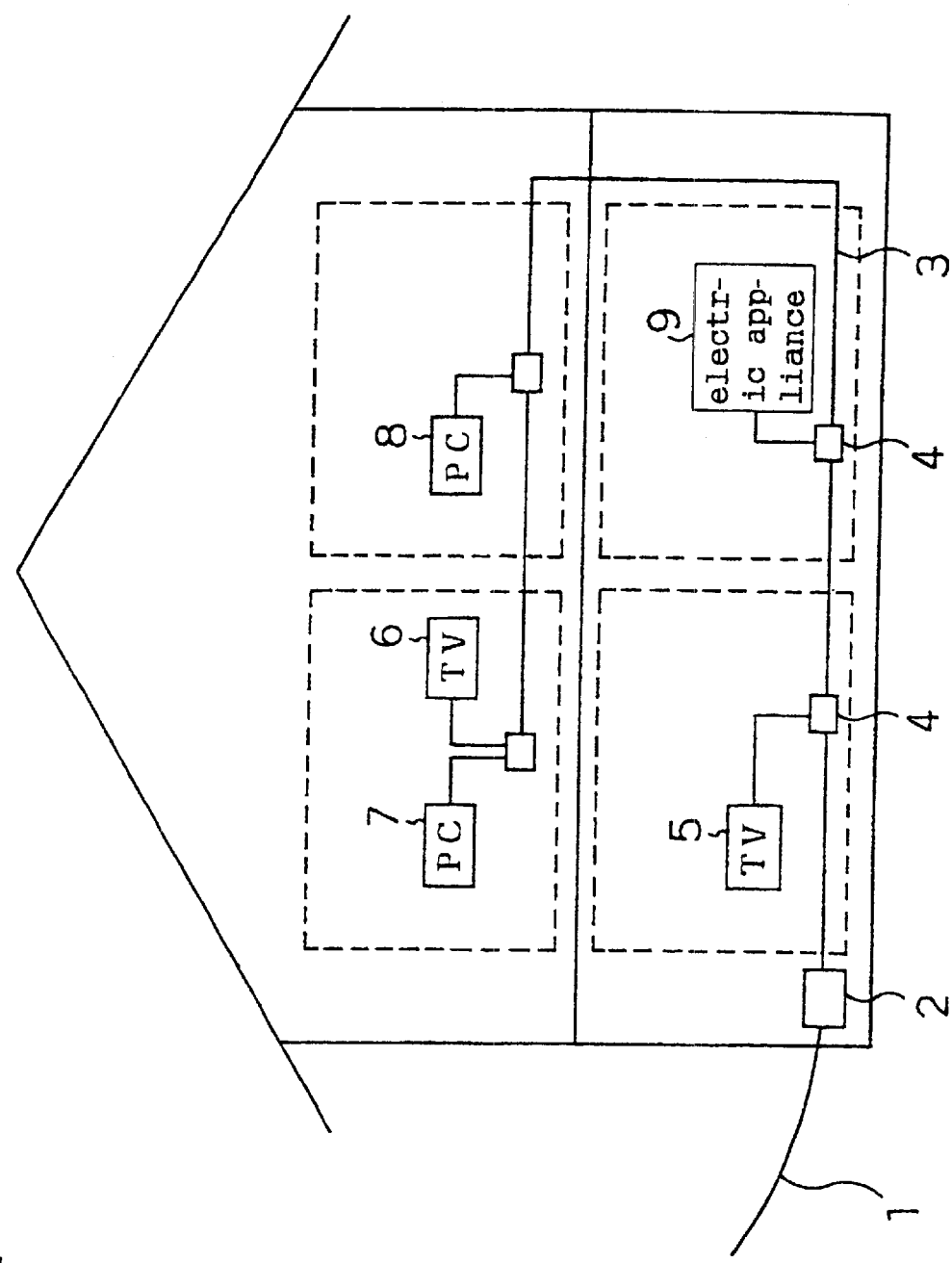
FIG. 1 is an example of an informational wiring within a residence according to the first present invention.

1: social communication network
2: gateway device
3: informational wiring
4: informational outlet
5, 6: TV
7, 8: PC
9: electric appliance
10: outlet frame body
11: power source outlet
12: multimedia service outlet
13, 61, 62, 63: information exchange section
14: electricity supply section
15: protrusion for ejection of information exchange section
16: backup battery
17: informational cable (side wall)
18: AC cable
19: guide for prevention of error insertion
20: informational cable (room side)
21: LED
22: protrusion for pressing of protrusion for ejection (ejection means)
23: edge connector (female)
24: edge connector (male)
26: lever
27: electricity supplying circuit
28: electricity receiving circuit
29: opening section
30: AC/DC converter
33: wiring holder
36: connector
37: signal transmission circuit
38: signal transit circuit
39: information processing circuit
1001: active informational outlet
1002: first port
1003: transition wiring
1004: wall face
1005: control section
1006: attachment support frame
1007: attachment frame
1008: outlet frame
1009: outlet panel
1010: AC connection cable
1011: screw
1012: bite connection section
1013: bitten connection section
1014: control board
1015: power source board
1016: electrically conductive plate
1017: second port
1018: AC supplied section
1019: DC supply section
1020: DC supplied section
1021: DC connection cable
1022: control side spacer
1023: power-source side spacer
1024: control FG point
1025: power source FG point
1026: FG pattern
1027: DC power source supply terminal
1028: FG connection terminal
1029: DC supplied section
1030: control section
1031: reset section
1032: clock section
1033: filter section
1034: AC supplied terminal
1035: FG terminal
1036: DC supply terminal
1037: FG terminal
1038: FG connection wiring pattern
1039: AC filter section
1040: AC/DC conversion section
1041: DC filter section
1042: active informational outlet A
1043: second port
1044: first port
1045: informational terminal A
1046: connection cable A
1047: active informational outlet B
1048: second port
1049: first port
1050: informational terminal B
1051: informational terminal C
1052: connection cable B 1053: connection cable C
1054: transition cable
1101: room A
1102: room B
1103: wall
2001: first port
2002: second port
2003: DC(+) supply terminal
2004: DC(−) supply terminal
2005: frame ground terminal
2006: power source supply terminal
2007: control board A
2008: control board B
2009: power source board
2010: connector A
2011: connector 1B
2012: connector 2B
2013: connector C
2014: clock section
2015: reset section
2016: control section
2017: first filter section
2018: second filter section
2019: bite claw section
2020: bitten claw section
2021: attachment frame
2022: lines collection module
2023: informational terminal A
2024: informational terminal B
2025: informational terminal C
2026: connection cable A
2027: connection cable B
2028: connection cable C
2029: transition wiring
2030: lines collection module 1A
2031: lines collection module 2A
2032: informational outlet A
2033: lines collection module 1B
2034: lines collection module 2B
2035: informational outlet B
2051, 2052, 2055, 2056: first port
2053, 2054, 2057, 2058: second port
2101: room A
2102: room B
2103: wall

BEST MODE FOR CARRYING OUT THE INVENTION

Embodiment of the first present invention are described below with reference to the drawings.

FIG. 1 shows one embodiment of an informational outlet according to the first present invention applied for the informational wiring within a residence. Social communication network 1, such as telephone and ISDN, is introduced into home, and an informational wiring is made into each room of the home in bus type topology. The informational wiring 3 branches out at a required number of informational outlets 4 located in each room, and the information is distributed to the terminals, such as TV's 5, 6, PC's 7, 8, and an electric appliance 9, by connecting the informational outlets 4 to the terminals 5, 6, 7 and 8 [sic: 5, 6, 7, 8 and 9]. As such, these terminals can communicate with the social communication network or with each other of the devices in the home.

Figure 2:
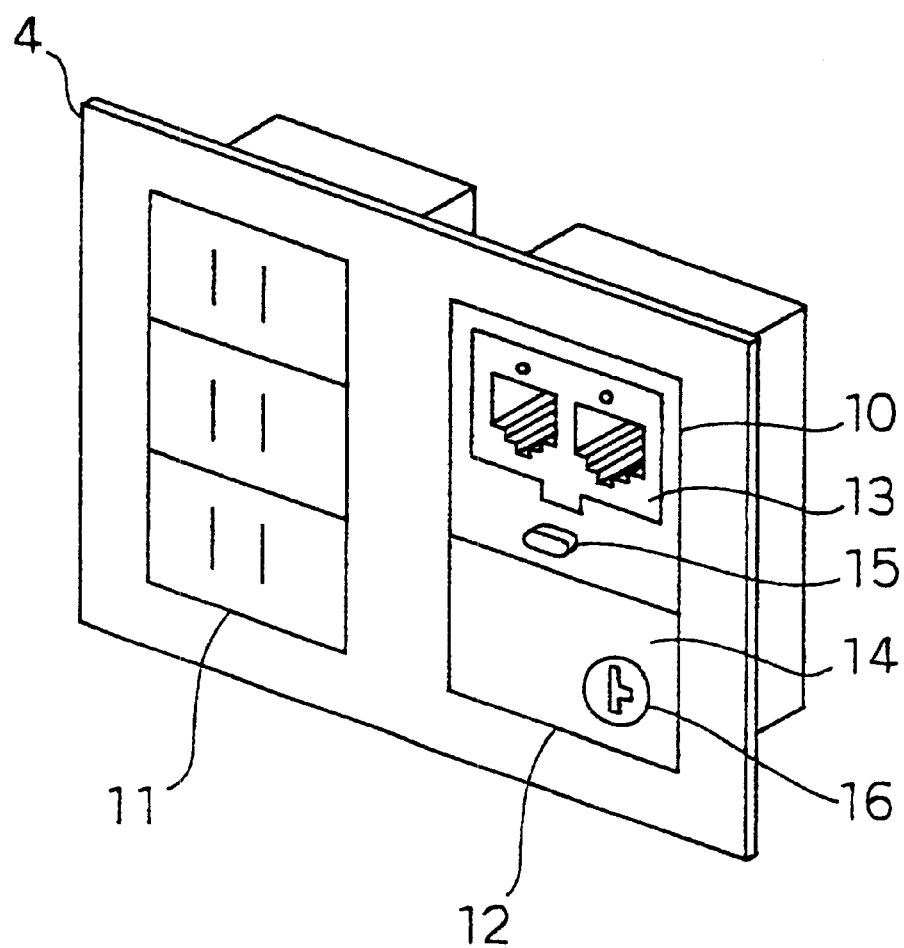
FIG. 2 is a perspective illustration of an informational outlet according to one embodiment of the first present invention viewed from the front side.

FIG. 2 is a perspective illustration of the informational outlet 4 of the present embodiment viewed form the room inside, and a power source outlet 11 is juxtaposed with a multimedia service outlet 12 for branching the informational wiring and for acquiring the information. The multimedia service outlet 12 comprises: an outlet frame body 10 having an information exchange section exchangeable depending on the communication method such as Ethernet and IEEE 1394-1995, and an electricity supply section 14 for supplying the electric power to the information exchange section 13. The outlet frame body 10 further has an protrusion 15 as ejection means for easily attaching and detaching the information exchange section 13. By pressing the protrusion 15, the information exchange section 13 can be easily ejected from the outlet frame body 10 as described later. The electricity supply section 14 further comprises a battery 16 for backup.

Figure 3:
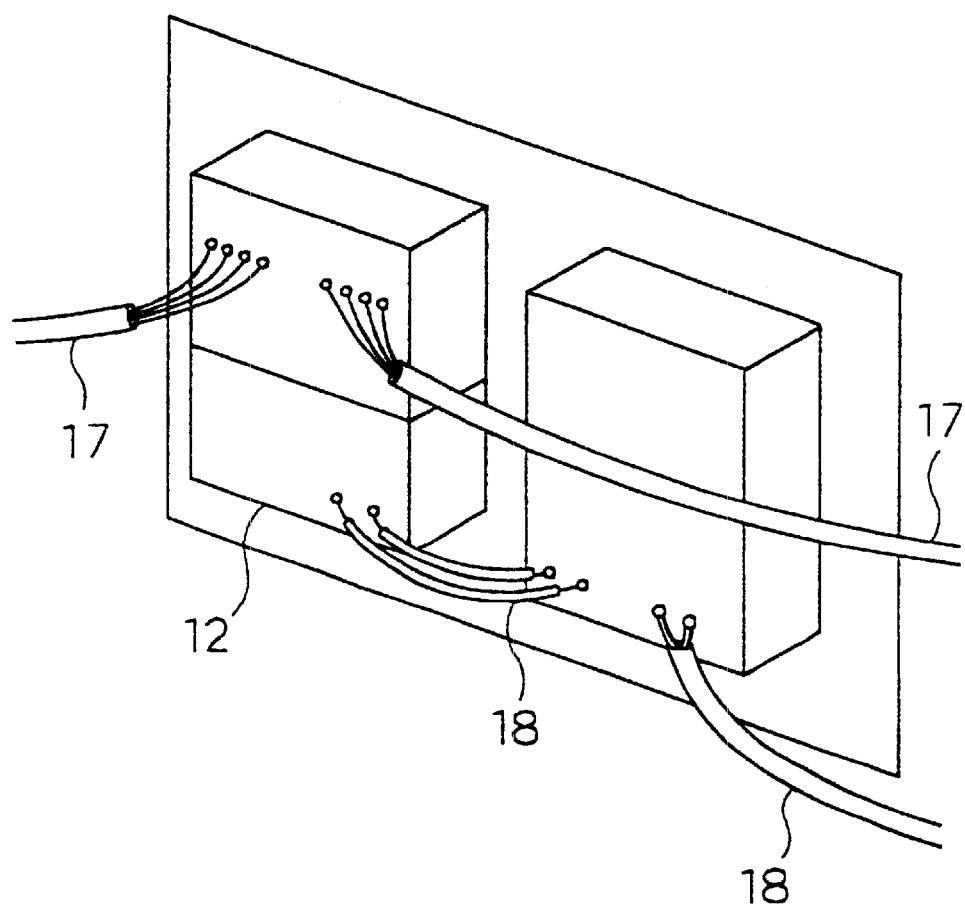
FIG. 3 is a perspective illustration of an informational outlet according to one embodiment of FIG. 2 viewed from the rear side.

FIG. 3 is a perspective illustration of the informational outlet 4 of the present embodiment viewed form the wall face side. The multimedia service outlet 12 is connected to informational wiring cables 17 for wiring between the adjacent multimedia service outlets and to AC cables 18 for supplying the electricity.

Although the multimedia service outlet 12 is juxtaposed with the power source outlet 11 in the present embodiment, an AC cable for supplying the electricity may be installed from another power source outlet located elsewhere.

Figure 4:
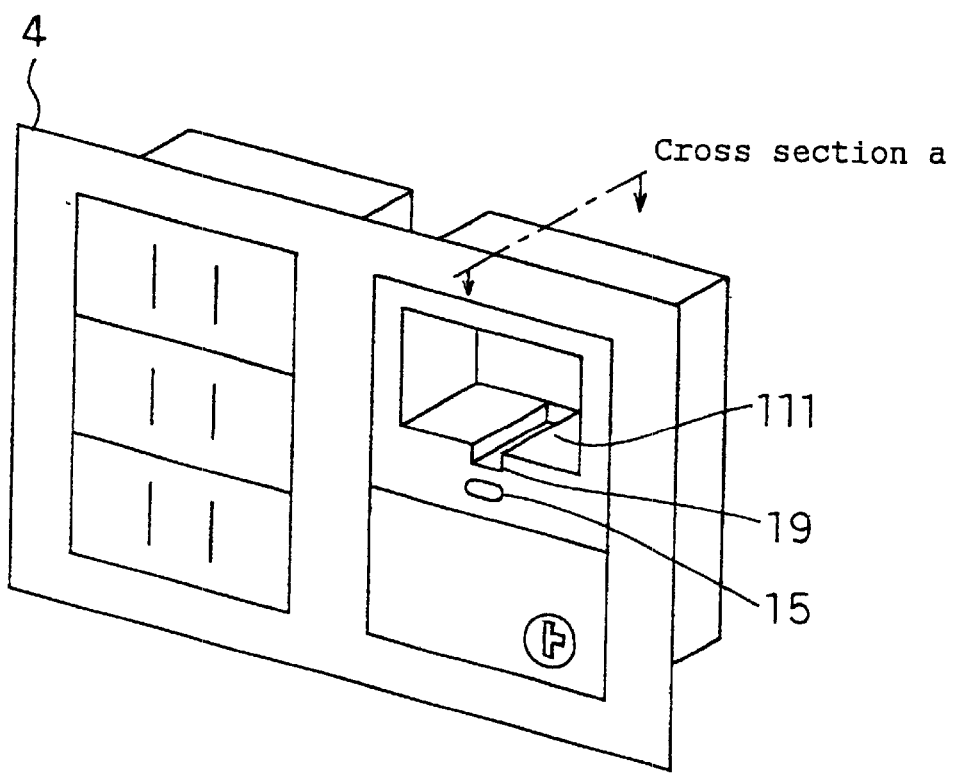
FIG. 4 is a perspective illustration of an informational outlet according to one embodiment of FIG. 2 viewed from the front side with the information exchange section removed.

FIG. 4 is a perspective illustration of the outlet frame body 10 and so on of the informational outlet 4 according to the present embodiment viewed from the room side with the information exchange section removed. The multimedia service outlet 12 is provided with a recess for receiving the information exchange section 13. The bottom face of the recess 111 is provided with a guide 19 for preventing an error insertion such as a mistake in the direction of the insertion of the information exchange section 13. The information exchange section 13 side has a ridge 131 (see FIG. 5) corresponding to that shape.

Although a guide is used for preventing an error insertion in the present embodiment, a pin or other method may be used.

Figure 5:
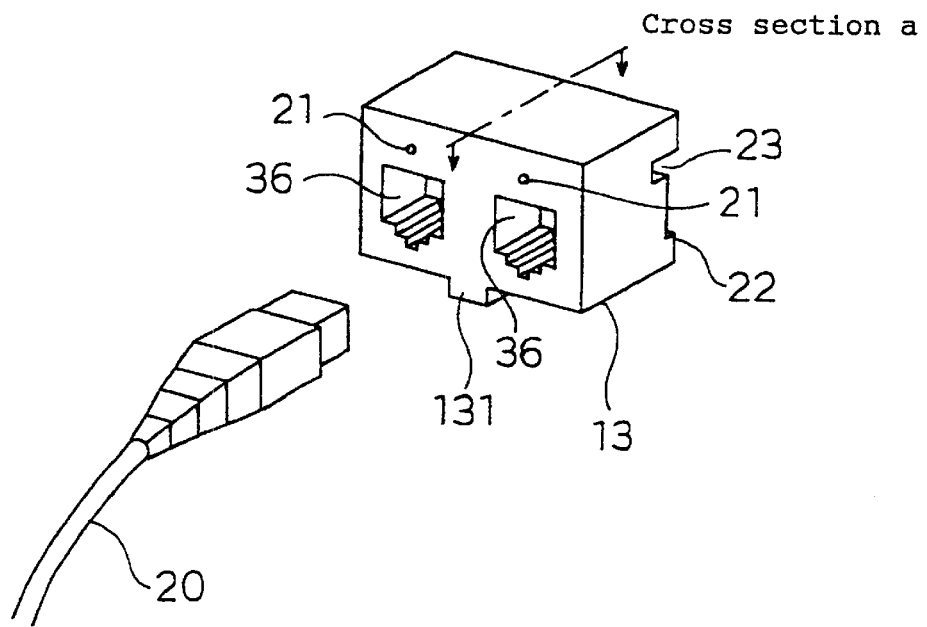
FIG. 5 is a perspective illustration of the information exchange section of an informational outlet according to one embodiment of the first present invention.

FIG. 5 is a perspective illustration of the information exchange section 13 of the present embodiment. The information exchange section 13 comprises two outlets 36 (corresponding to the first outlets of the first present invention) each for receiving an informational cable 20 from a terminal. An LED 21 indicates the state of operation of the information exchange section 13. The state of operation displayed by blinking indicates generally the state of electrical connection or the state of communication depending on the different communication method.

The ridge 131 mentioned above is formed in the bottom face of the information exchange section 13, and in the rear face thereof, a protrusion 22 for ejection is formed for easily ejecting the information exchange section 13. The protrusion 22 allows the information exchange section 13 to be easily ejected in linkage with said protrusion 15 as described later. The rear face of the information exchange section 13 is further provided with an edge connector (female) 23 (corresponding to the third connector of the first present invention). The edge connector 23 is a connector for exchanging the signal with a wall face wiring, and may be replaced with a pin connector and so on other than the edge type one.

Figure 6:
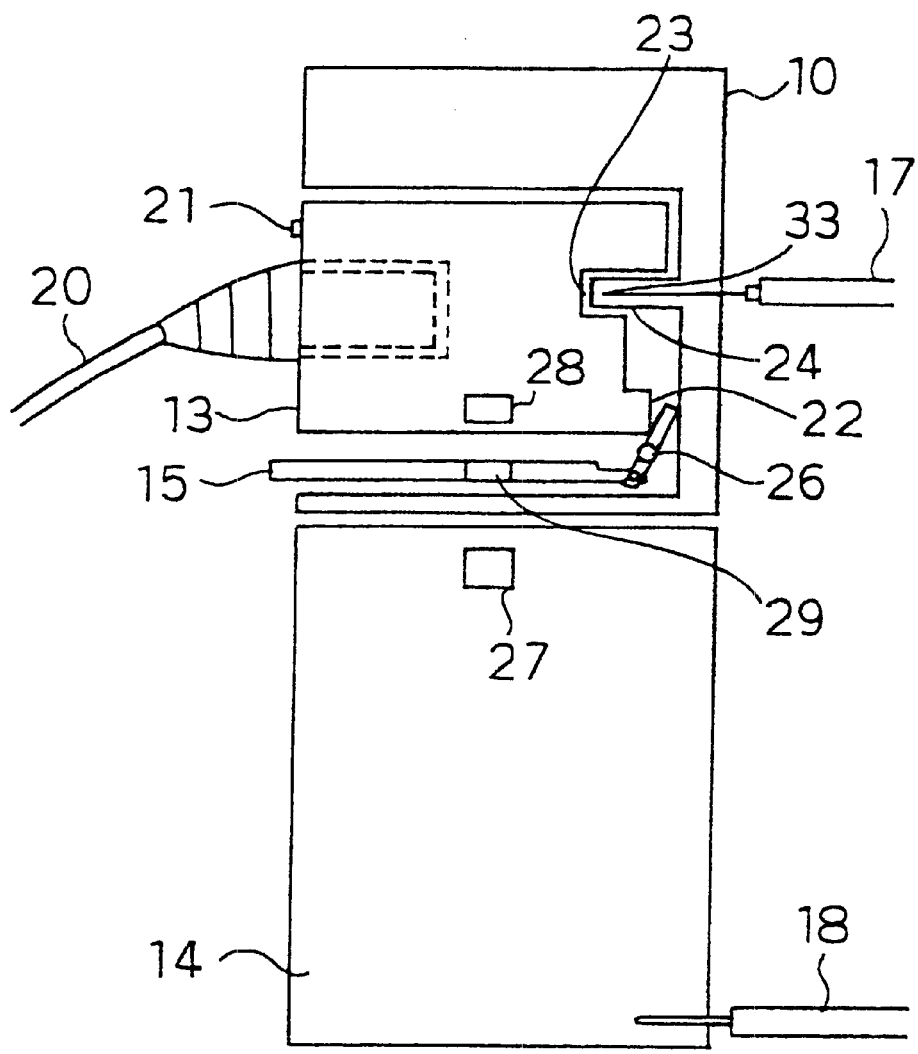
FIG. 6 is a schematic longitudinal cross section of an informational outlet according to one embodiment of the first present invention of FIG. 2.

FIG. 6 is a longitudinal cross section of an informational outlet 13 of the present embodiment. This cross section is generally in the direction of "Cross section a" shown in FIGS. 4 and 5. The electricity supply section 14 receives electricity from the AC cable 18 and supplies the electric power necessary for operation of the information exchange section 13. The electricity supply is conducted by electromagnetic induction method in the present embodiment. Numeral 27 is an electromagnetic induction electricity supplying circuit of the electricity supply section 14 side, and an electromagnetic induction electricity receiving circuit 28 in accordance with that circuit is installed in the information exchange section 13 side. The electromagnetic induction method realizes the easiness in attachment and detachment of the information exchange section 13 and prevents a short circuit in the electricity supply line when the information exchange section 13 is being detached. However, other electricity supply method such as pin method and edge method may be used.

When such information exchange section 13 is attached in the outlet frame body 10, the protrusion 22 in the rear face of the information exchange section 13 confronts the upper edge of a lever 26 provided in the innermost part of the recess 111 of the outlet frame body 10 and turns the lever 26 in the clockwise direction in FIG. 6. Since the lower edge of the lever 26 is linked with the top tip of a rod section 151, which is an extension portion of the protrusion 15 provided in the outlet frame body 10, the protrusion 15 protrudes outward from the outlet frame body 10.

When the protrusion 15 is pressed, the lower edge of the lever 26 linked wit h the rod section 151 revolves in reverse, and the upper edge of the lever 26 revolves in the counter-clockwise direction to force out reversely the protrusion 22 mentioned above, and then the information exchange section 13 is ejected. As such, the information exchange section 13 can be easily removed.

Furthermore, the rod section 151, which extends from the protrusion 15 to the lever 26, is provided with an opening section 29. The opening section 29 is opened when the lever 26 moves after the information exchange section 13 is installed, which permits the electricity supply from the electricity supplying circuit 27 to the electricity receiving circuit 28 by means of the electromagnetic induction, and when the lever moves correspondingly to the detachment of the information exchange section 13, the opening section 29 is shielded so as to inhibit the electromagnetic induction. This improves the safety. The mechanism to open and close the opening section 29 is, for example, a shutter (not shown) provided in the rod section 151 for opening and closing the opening section 29, said shutter being hooked to a claw (not shown) fixed in the outlet frame body 10 so as to open and close the opening section 29 depending on the movement of the rod section 151.

At the position of the outlet frame body 10 corresponding to that of the edge connector (female) 23 in the rear face of. the information exchange section 13, an edge connector (male) 24 (corresponding to the second connector of the first present invention) is formed to connect thereto. The edge connector 24 is connected to a wiring holder 33 so as to be able to exchange information with the informational cable 17 in the wall face side connected to the wiring holder 33.

Figure 7:
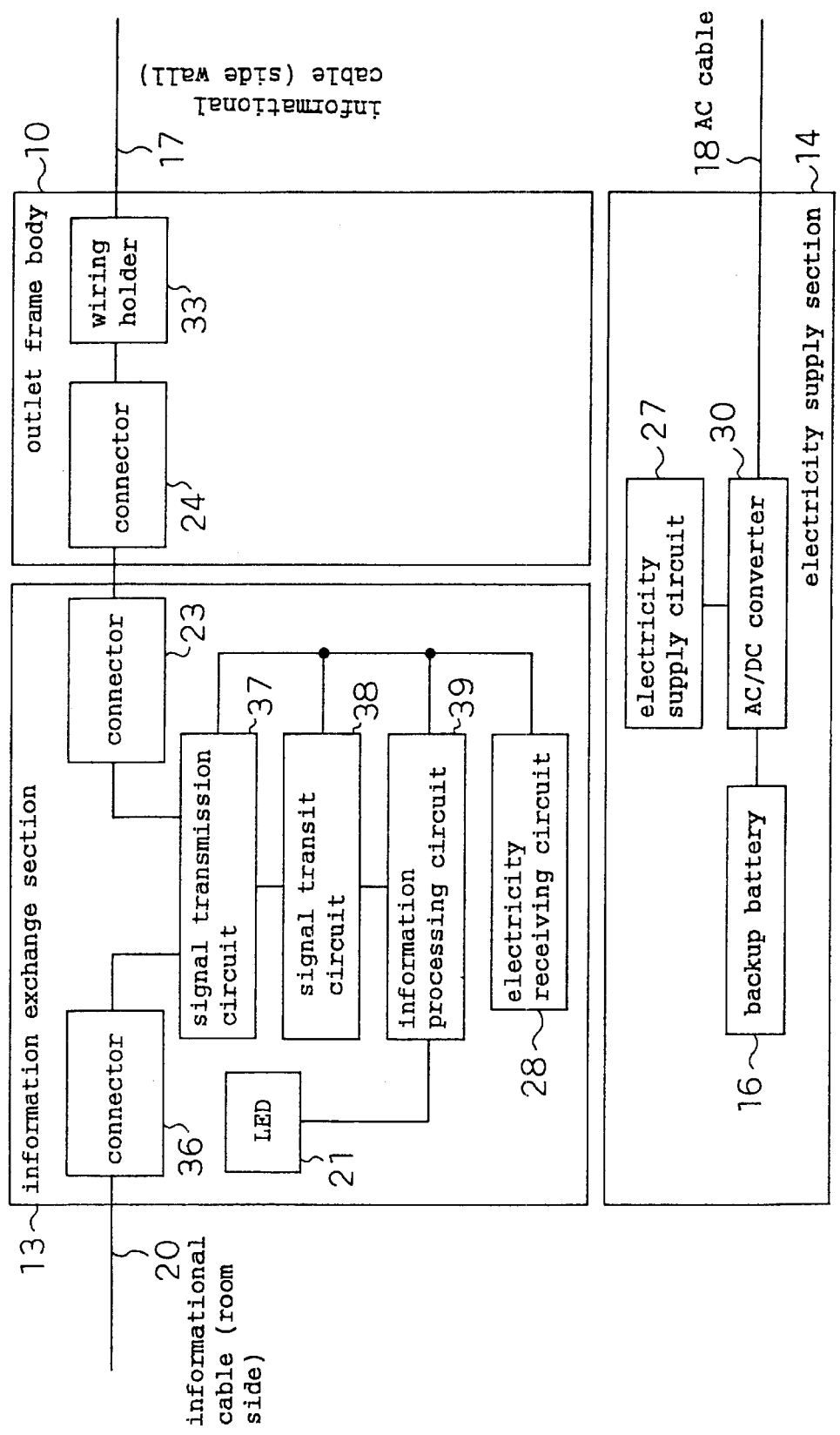
FIG. 7 is a b lock diagram showing the function of an informational outlet according to one embodiment of the first present invention

FIG. 7 is a block diagram showing the function of an informational outlet of the present invention. The electricity supply section 14 is supplied with electricity by the AC cable 18 and supplies electric power through an AC/DC converter 30 to the electricity supplying circuit 27. The backup battery 16 also can supply electric power.

The connector [sic: outlet] frame body 10 is provided with the edge connector 24 and the wiring holder 33 connected thereto, and the wiring holder 33 is connected to the informational cable 17 in the wall face side.

The information exchange section 13 comprises: the edge connector 23; a connector 36 connected to the informational cable 20 in the room side; and a signal transmission circuit 37, a signal transit circuit 38, and an information processing circuit 39 all for receiving and processing the signal from the connectors 23, 36; wherein said circuits perform the electrical transit, logical transit, and information processing of information, respectively. Respective one of the circuits 37, 38, 39 is supplied with electric power from the electricity receiving circuit 28. The state of operation of the information processing is displayed with the LED 21. Th electric transit is called the hub function and to perform the electrical transit, reproduction, and distribution of signal. The logical transit, for example, performs the selection of transit site in response to the addressee of the packet, such as bridges and routers, and processes a conversion if different communication methods are used, for example, when wired communication is used in the wall face and wireless network is used in the room face. In this instance, specific packets can be set not to be transited, for example, so that the access to harmful information is inhibited in the children's room. The information processing is, for example, the management of operation such as setting and controlling of operation of the informational outlet, which is remotely conducted by a PC or similar connected to the informational wiring.

Figure 8:
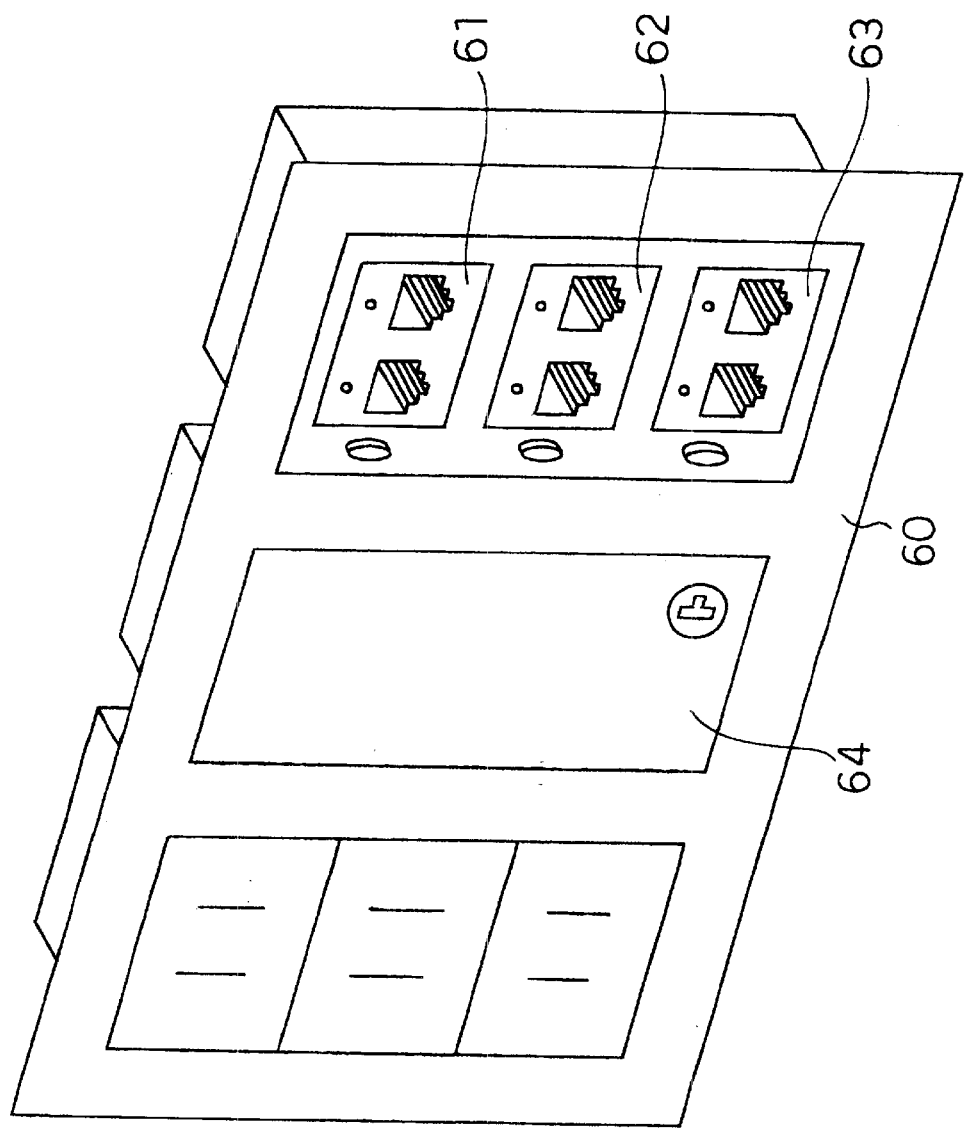
FIG. 8 is a perspective illustration of an informational outlet according to another embodiment of the first present invention viewed from the front side.

FIG. 8 is a perspective illustration of an informational outlet according to another embodiment of the first present invention viewed from the room side. This is the example in which the electricity supply section 64 is located on a side of the multimedia service outlet 60 having a plurality of information exchange sections 61, 62, 63. The present example is different from the previous embodiment in that the electricity supply is conducted from a side direction and that a plurality of information exchange sections are supplied with electricity by a single electricity supply section.

Embodiments of the second present invention are described below with reference to FIGS. 9–16.

(Embodiment 1)

Figure 9:
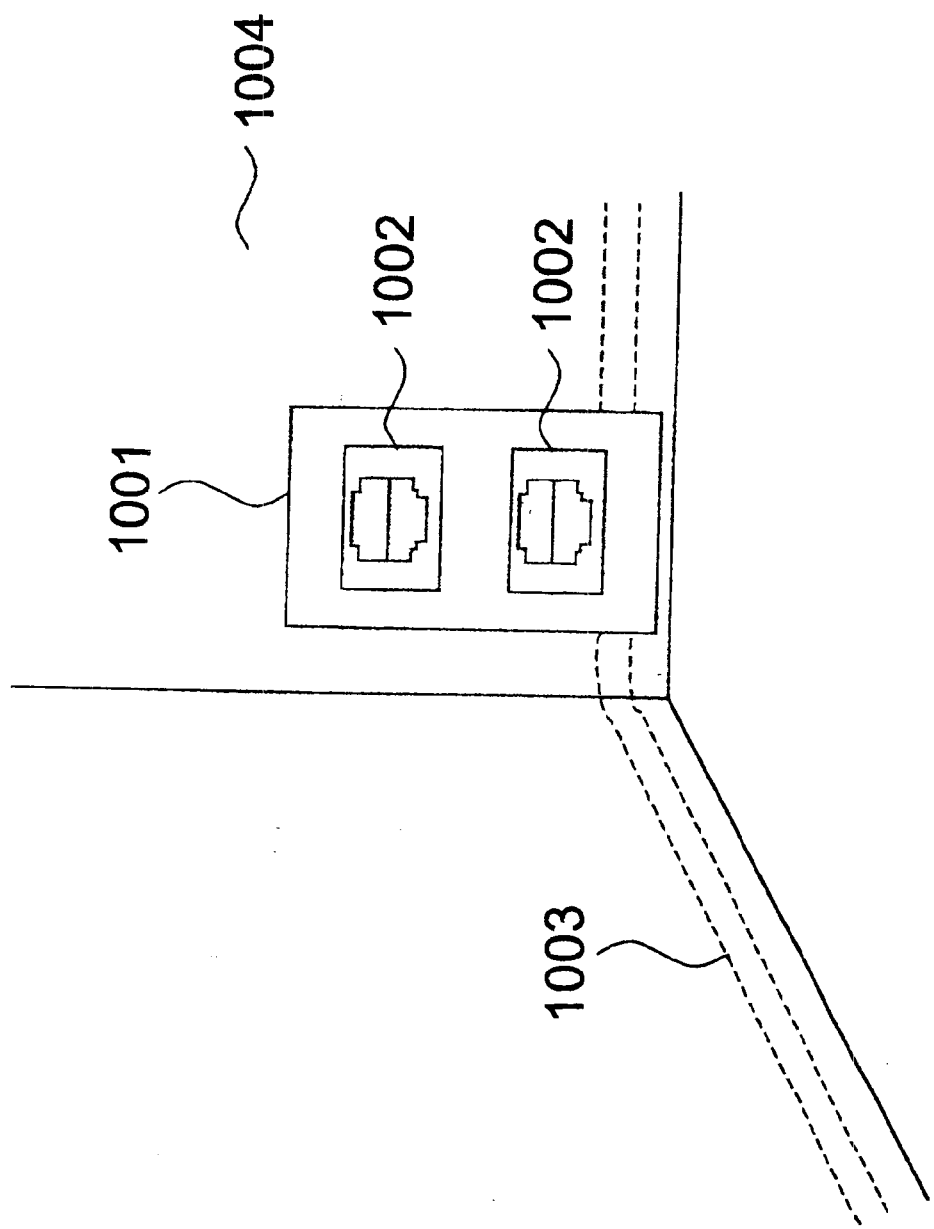
FIG. 9 is a perspective illustration showing an active informational outlet according to one embodiment of the second present invention.

FIG. 9 is a perspective illustration of an active informational outlet according to one embodiment of the second invention of the present invention, and in FIG. 9, numeral 1001 is an active informational outlet of the second invention of the present invention, 1002 is the first port, 1003 is transition wiring, and 1004 is a wall face.

In the active informational outlet mentioned above, the action thereof is described below as well as the effect thereof. In FIG. 9, the active informational outlet 1001 is the example with two of the first ports 1002, and is embedded in the wall face 1004 and is connected through the transition wiring 1003 to transit devices such as other active informational outlets.

A connection cable from another informational terminal is connected to the first port 1002, and the active informational outlet 1001 performs the function of a communication transit device which allows the informational terminal connected at the first port 1002 to communicate with another informational terminal connected beyond the transition wiring but not shown, and further performs the function of a communication transit device in case that a plurality of the first ports 1002 is provided, in other words, the active informational outlet 1001 can play a role generally called a hub for LAN or similar.

(Embodiment 2)

Figure 10:
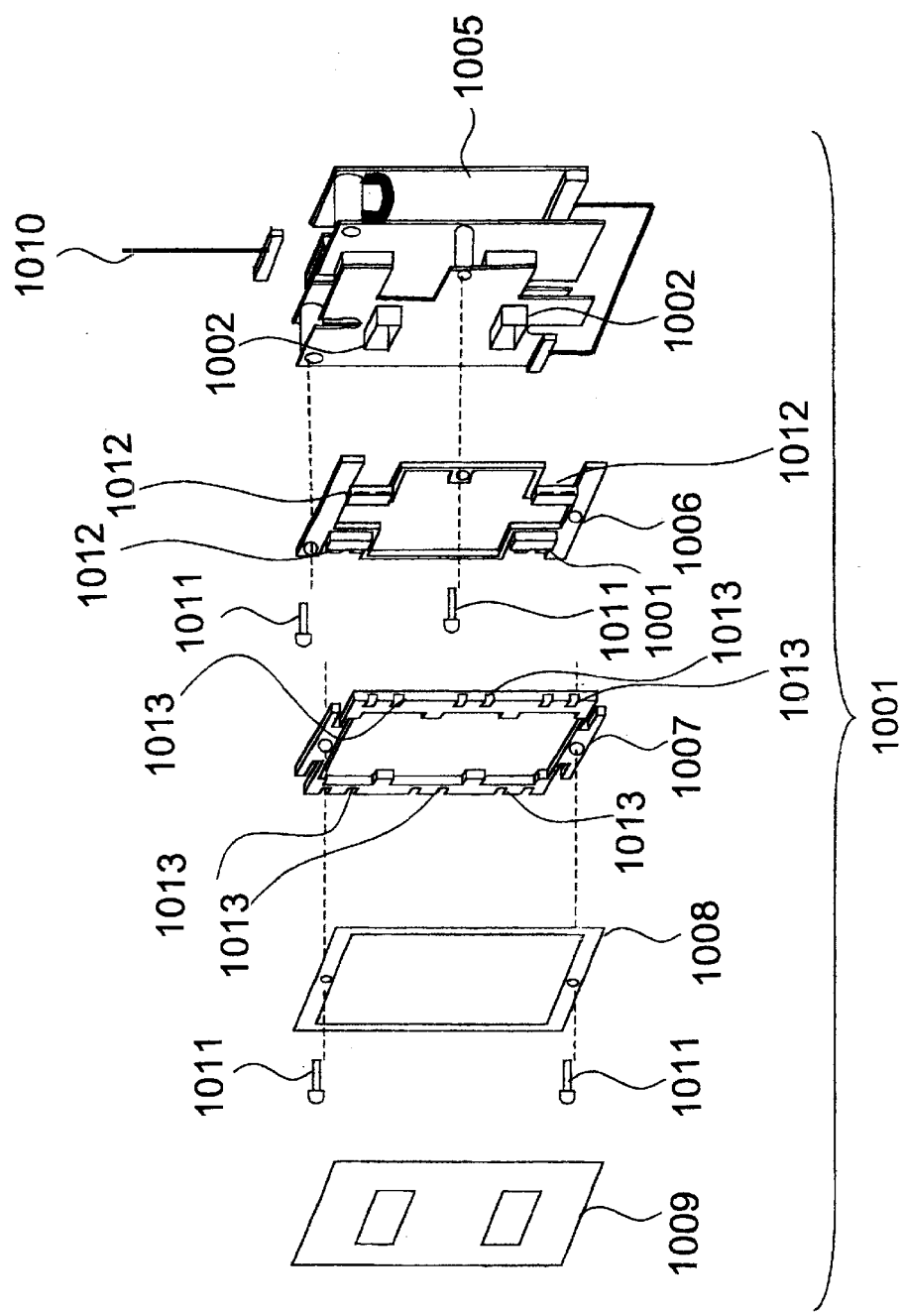
FIG. 10 is a conceptual illustration showing the configuration of an active informational outlet according to one embodiment of the second present invention.

FIG. 10 shows an example of the configuration of an active informational outlet of the second invention of the present invention, and in FIG. 10, numeral 1005 is a control section, 1006 is an attachment support frame, 1007 is an attachment frame, 1008 is an outlet frame, 1009 is an outlet panel, 1010 is an AC connection cable, 1011 is a screw, 1012 is a bite connection section, and 1013 is a bitten connection section.

In the active informational outlet mentioned above, the action thereof is described below as well as the effect thereof.

The control section 1005 is for realizing the function of a communication transit device as a hub of the active informational outlet 1001 of the second invention of the present invention, as was described in Embodiment 1, and the AC connection cable 1010 is connected thereto.

The other component members are for embedding or attaching the control section 1005 in or to the wail face.

Commercial parts may be used for the attachment frame 1007, the outlet frame 1008, and outlet panel 1009, and the outlet frame 1008 is fixed to the attachment frame 1007 using the screws 1011, and further the outlet panel 1009 is fixed to the outlet frame 1008 by means of a plug-in structure.

The attachment support frame 1006 is for fixing the control section 1005 to the attachment frame 1007, and the attachment frame 1007 is provided with bitten claw sections for fixing, and the bite claw sections for fixing to the attachment frame 1007, and is provided with the screw holes for fixing the control section 1005 using screws 1011.

Figure 11:
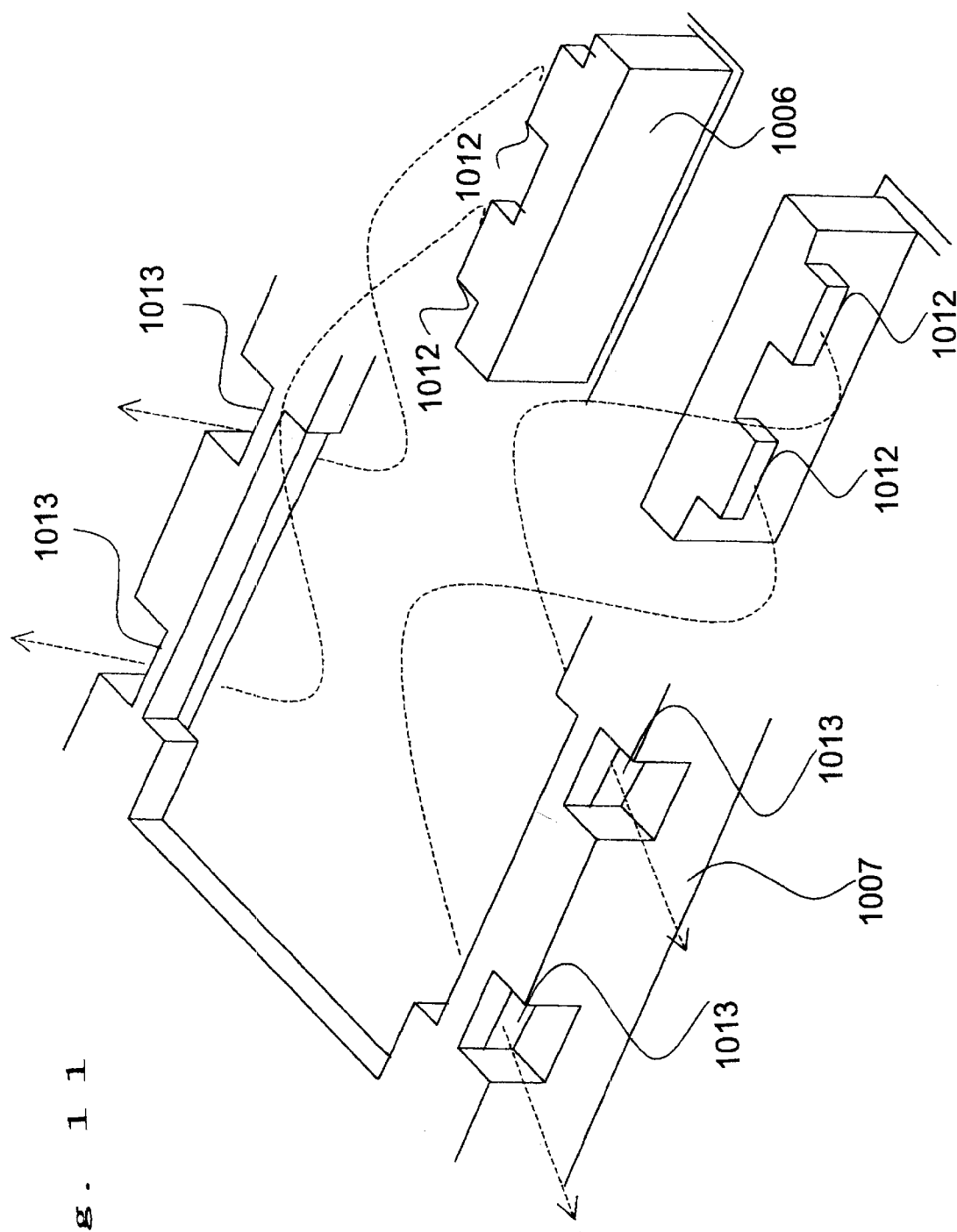
FIG. 11 is a conceptual illustration of the bite connection section of an active informational outlet according to one embodiment of the second present invention.

A conceptual illustration of the bite connection sections 1012 and the bitten connection sections 1013 is shown in FIG. 11, and in FIG. 11, since the structure is such that the bite claw section 1012 hooks on the bitten claw section 1013, these sections are detachable after attachment.

(Embodiment 3)

Figure 12:
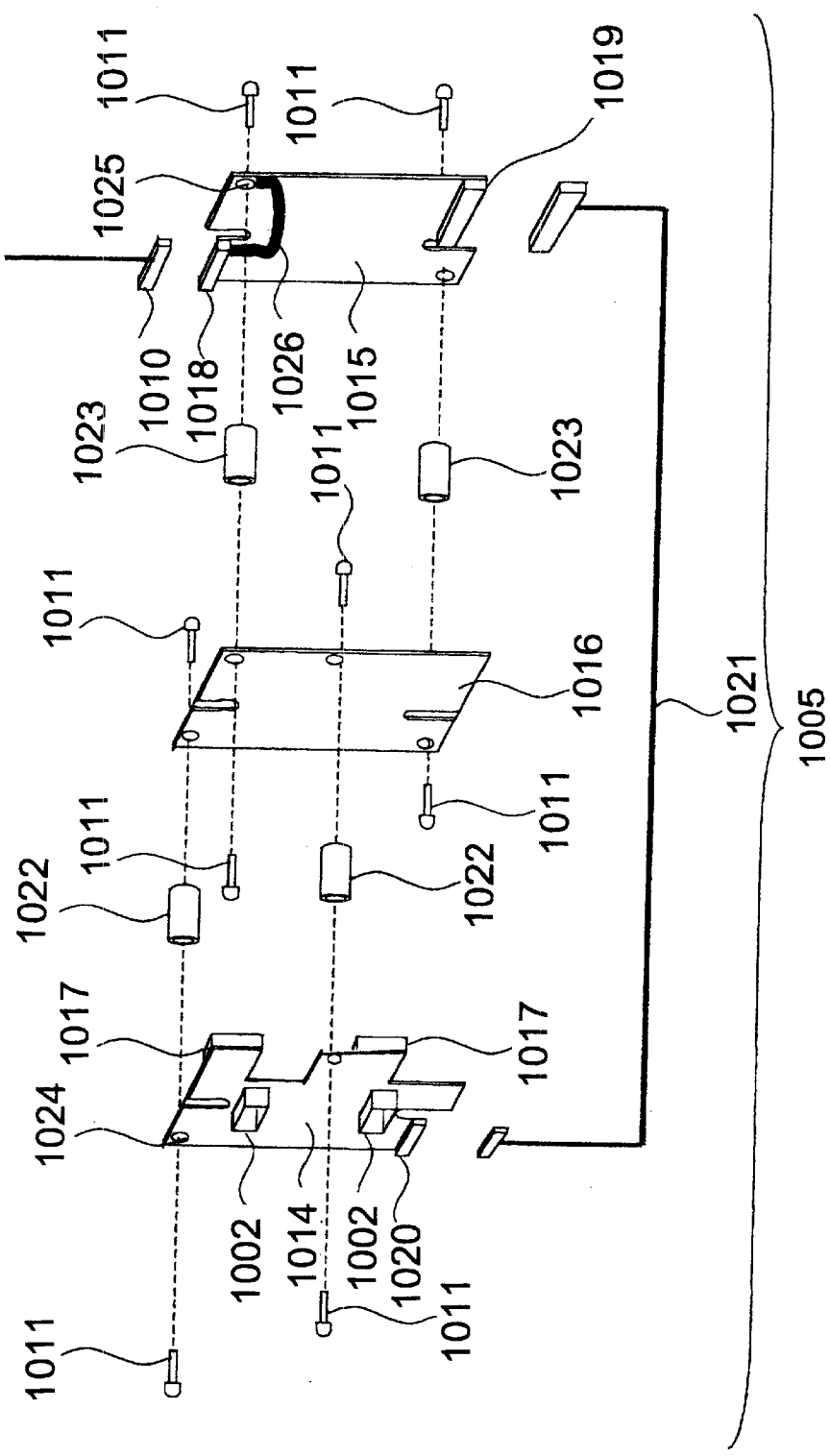
FIG. 12 is a conceptual illustration showing an example of the configuration of the control section of an active informational outlet according to one embodiment of the second present invention.

FIG. 12 shows an example of the configuration of the control section 1005, and in FIG. 12, numeral 1004 is a control board, 1015 is a power source board, 1016 is an electrically conductive plate, 1017 is the second port, 1018 is an AC supplied section, 1019 is a DC supply section, 1020 is a DC supplied section, 1021 is a DC connection cable, 1022 is a control side spacer, 1023 is a power-source side spacer, 1024 is a control FG point, 1025 is a power source FG point, and 1026 is an FG pattern.

In the control section 1005 mentioned above, the action thereof is described below as well as the effect thereof.

FIG. 12 shows the example of the form in which the control board 1014 and the power source board 1015 are separated and in which the control board 1014 has two of the second ports 1017.

In FIG. 12, an transition wiring 1003 is connected to the second port 1017, the control board 1014 realizes the hub function, and the power source board 1015 supplies the DC power source necessary for the control board 1014 to the control board 1014 by converting the AC power source.

Here, electromagnetic radiation noise from the power source board 1015 is one of the noise sources causing the malfunctioning of the control board 1014.

With regard to the method to reduce the influence of the electromagnetic radiation noise onto the control board 1014, a generally used technique is to shield between the control board 1014 and the power source board 1015 so that the electromagnetic rays from the power source board 1015 do not reach at the control board 1014, accordingly, anti-noise treatment was conducted by providing the electrically conductive plate 1016 as the electrostatic shield between the control board 1014 and the power source board 1015.

Since the electrically conductive plate 1016 of the electrostatic shield needs to be connected to the FG, the connection between the electrically conductive plate 1016 and the FG is accomplished by the following route: the control FG point 1024 of the control board 1014 and the electrically conductive plate 1016 are interconnected via the control side spacer 1022; the power source FG point 1025 of the power source board 1015 and the electrically conductive plate 1016 via the power-source side spacer 1023; the control FG point 1024 and the DC supplied section 1020 through a wiring pattern; the power source FG point 1025 and the DC supply section 1019 through a wiring pattern; the AC supplied section 1018 and the DC supply section 1019 through a wiring pattern; and the DC supply section 1019 and the DC supplied section 1020 through the DC connection cable 1021.

Further, since the electrically conductive plate 1016 is for shielding the phenomenon that the electromagnetic radiation noise generated in the power source board 1015 reaches at the control board 1014, if opening exist, the leakage through the openings occurs. Therefore, the number of openings in the electrically conductive plate 1016 is preferred to be a minimum. Thus, it is preferred that the electrically conductive plate 1016 does not have openings exceeding the total number of the number of the control FG points 1025 and the number of the power source FG points 1026. Moreover, with regard to the number of the control FG points 1017 and the number of the power source FG points 1018, these FG points play an additional role of fixing the control board 1005 [sic: 1014] and the power source board 1006 [sic: 1015], and hence, the minimum number required for fixing those boards will do, and FIG. 12 shows the example with two holes each.

(Embodiment 4)

Figure 13:
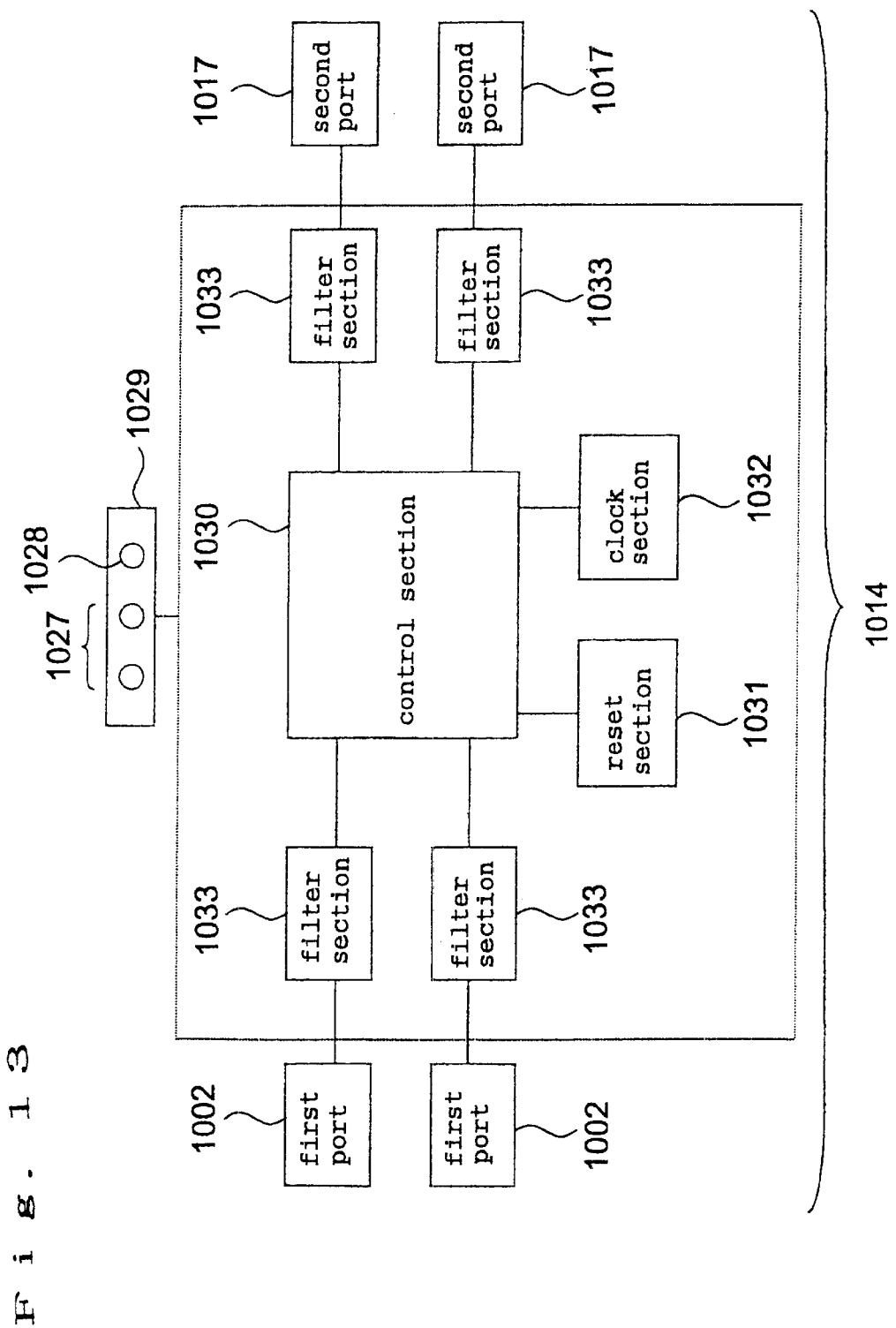
FIG. 13 is a conceptual illustration showing an example of the configuration of the control board of an active informational outlet according to one embodiment of the second present invention.

FIG. 13 shows the configuration of the control board 1014, and in FIG. 13, numeral 1027 is a DC power source supply terminal, 1028 is an FG connection terminal, 1029 is a DC supplied section, 1030 is a control section, 1031 is a reset section, 1032 is a clock section, and 1033 is a filter section.

In the control board 1014 mentioned above, the action thereof is described below as well as the effect thereof.

In FIG. 13, the control section 1030 having the hub function controls the signal between the first port 1002 and the second port 1017, wherein the reset signal is supplied from the reset section 1031 and the clock signal is supplied from the clock section 1032, and wherein the required power source is supplied from the DC power source supplied terminal 1027 of the DC supplied section 1029.

The control section 1030 is capable of signal processing according to Ethernet 10BASE-T or Fast Ethernet 100BASE-T of IEEE 802.3 Standard, and the signal flows in either direction from the first port 1002 to the second port 1017 or from the second port 1017 to the first port 1002. The control section 1030 may be one that communicates according to IEEE 1394 Standard.

The filter sections 1033 are located between the first port 1002 and the control section 1030 and between the control section 1030 and the second port 1017, and electrically insulate between the control section 1030 and the cable side of both of the first port 1002 and the second ports 1017, and further have the function of noise elimination.

When the cables connected to the first port 1002 and the second ports 1017 are corresponding to shielded cables, in order to prevent the noise transmitted to the cables from affecting the control section 1030, the shells of the first port 1002 and the second ports 1017 are connected to the FG connection terminal 1028 of the DC supplied section 1029 through a wiring pattern, whereby the noise is purged into the FG.

(Embodiment 5)

Figure 14:
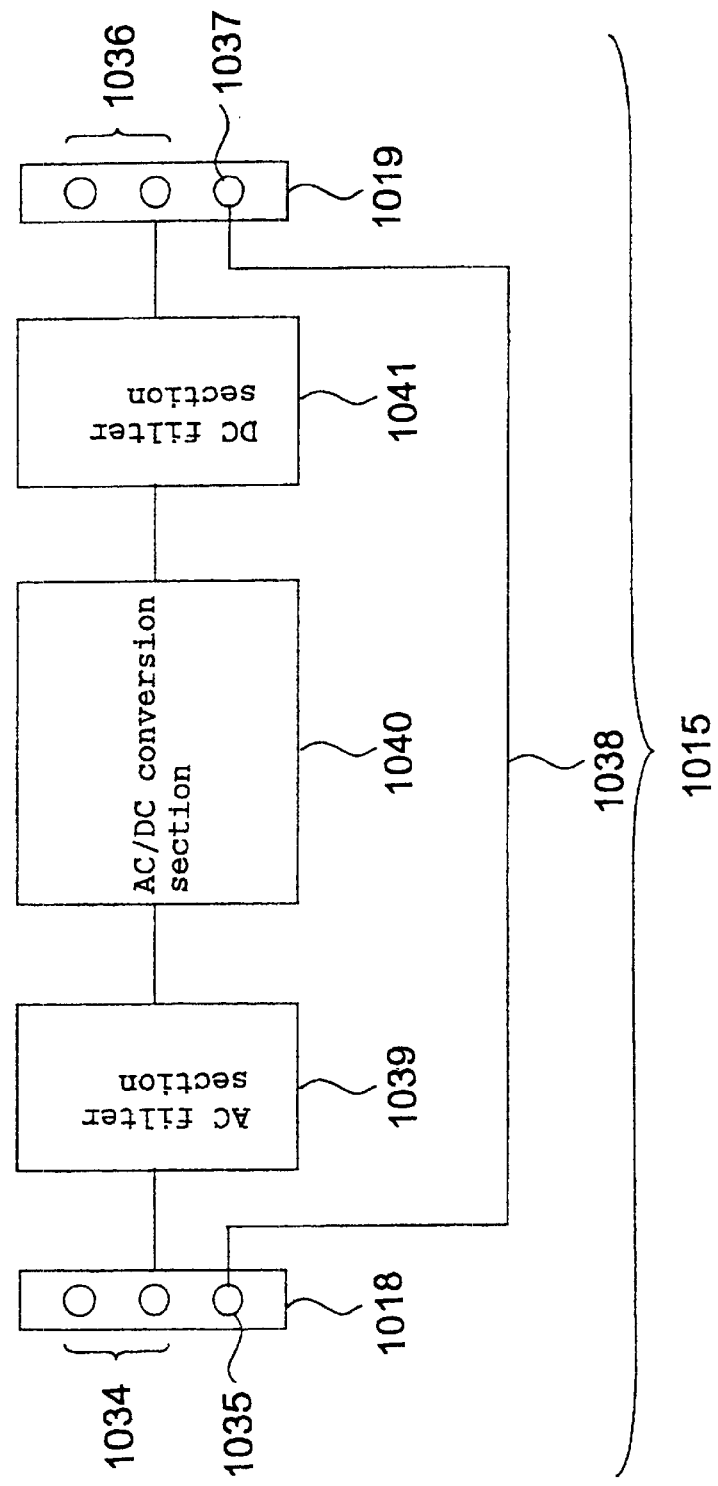
FIG. 14 is a conceptual illustration showing an example of the configuration of the power source board of an active informational outlet according to one embodiment of the second present invention.

FIG. 14 shows the configuration of the power source board 1015, and in FIG. 14, numeral 1034 is an AC supplied terminal, 1035 is an FG terminal, 1036 is a DC supply terminal, 1037 is an FG terminal, 1038 is an FG connection wiring pattern, 1039 is an AC filter section, 1040 is an AC/DC conversion section, and 1041 is a DC filter section.

In the power source board 1015 mentioned above, the action thereof is described below as well as the effect thereof.

The AC power source being input from the AC supplied terminal [sic: 1034] of the AC supplied section 1018 undergoes noise eliminationby the AC filter section 1039, then is converted into DC power source by the AC/DC conversion section 1040, and after that,undergoes noise eliminationby the DC filter section 1041 and is connected to the DC supply terminal 1036 of the DC supply section 1019. The FG terminal 1035 and the FG terminal 1037 are interconnected through the FG connection wiring pattern 1038.

(Embodiment 6)

Figure 15:
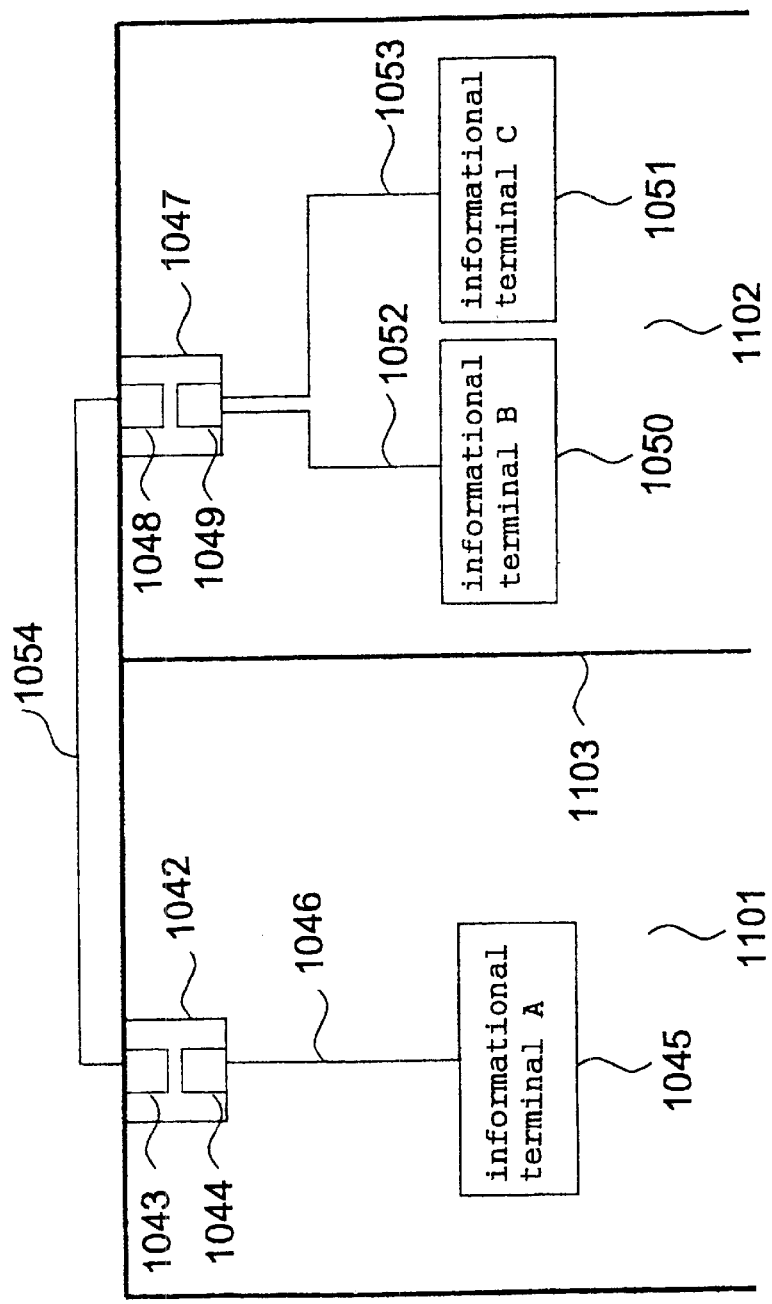
FIG. 15 is a conceptual illustration showing an example of usage of an active informational outlet according to one embodiment of the second present invention.
Figure 16:
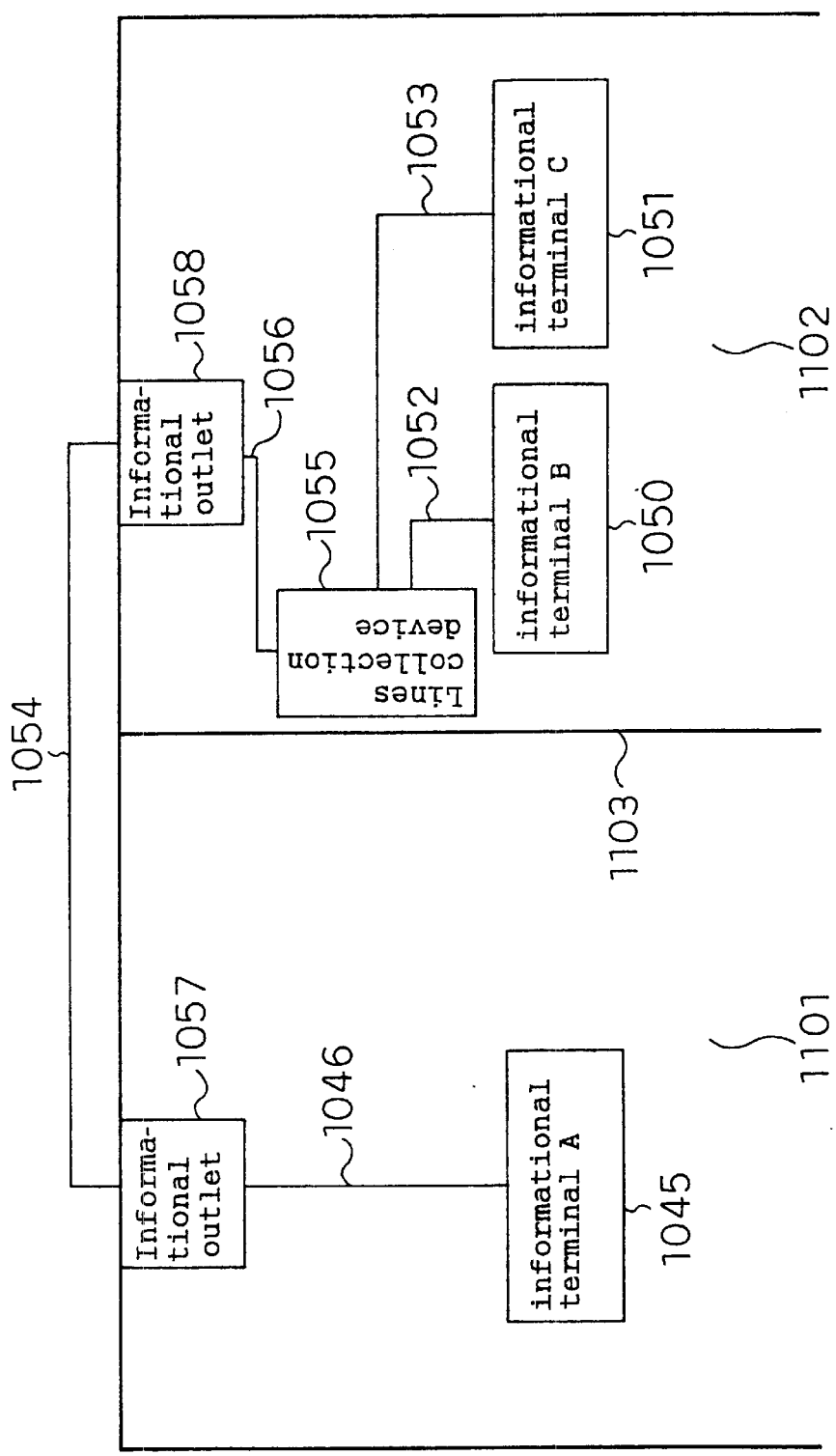
FIG. 16 is a conceptual illustration of an example of usage of an informational outlet and a lines collection device according to the prior art.

FIG. 15 shows an example of usage of the active informational outlet 1001 of the second present invention, and in FIG. 15, numeral 1042 is an active informational outlet A, 1043 is the second port, 1044 is the first port, 1045 is an informational terminal A, 1046 is a connection cable A, 1047 is an active informational out let B, 1048 is the second port, 1049 is the first port, 1050 is an informational terminal B, 1051 is an informational terminal C, 1052 is a connection cable B, 1053 is a connection cable C, 1054 is a transition cable, 1101 is a room A, 1102 is a room B, and 1103 is a wall.

In the example of usage of the active informational outlet mentioned above, the action thereof is described below as well as the effect thereof.

The room A 1101 and the room B 1102 are partitioned with the wall 1103, wherein the informational terminal A 1045 in the room A 1101 is connected to the first port 1044 of the active informational outlet A 1042 through the connection cable A 1046, and the informational terminal B 1050 in the room B 1102 is connected to the first port 1049 of the active informational outlet B 1047 through the connection cable B 1052, and the informational terminal C 1051 is connected to another of the first ports 1049 of the active informational outlet B 1047 through the connection cable C 1053, further wherein the second port 1043 of the active informational outlet A 1042 and the second port 1048 of the active informational outlet B 1047 are interconnected through the transition wiring 1054.

The transition wiring 1054 is for connecting the active informational outlet A 1042 and the active informational outlet B 1047, and does not need reconnection after the initial connection, and hence, may be installed within the wall face. The informational terminal A 1045, informational terminal B 1050, and informational terminal C 1051 can communicate only by being connected to the active informational outlet A 1042 and active informational outlet B 1047, which are located respectively in the room A 1101 and room B 1102, using the connection cable A 1046, connection cable B 1052 or connection cable C 1053.

Although the Embodiment of the second present invention is shown with the example of the form in which the control board 1014 and the power source board 1015 are separated, the present invention can be implemented in the form in which the control board 1014 and the power source board 1015 are integrated. In that instance, the electrically conductive plate 1016, the control side spacer 1022, the power-source side spacer 1023, the control FG point 1024, the power-source FG point 1025, and the FG pattern 1026 are unnecessary, and the DC supply section 1019, DC supplied section [sic: 1020] and the DC connection cable connecting them are formed in the wiring pattern. However, there exists the electromagnetic radiation noise from the power source function section implemented in the power source board 1015 into the control function section implemented in the control board, and hence, in order to alleviate it, an area having no component other than the minimum required pattern, such as the DC power source wiring pattern, is provided between the power source function section and the control function section so that the electromagnetic rays generated in the power source function section do not reach at the control function section.

Although the Embodiment of the second present invention is shown with the example of the form in which the control board 1014 and the power source board 1015 are separated and the electrically conductive plate 1016 is provided therebetween, the present invention can be implemented in the embodiment in which the power source board 1015 itself is enclosed in a case having an opening section only for allowing at least the AC connection cable 1010 and DC connection cable 1021 to pass through, and further the present invention can also be implemented in the embodiment in which the control board 1014, power source board 1015, and electrically conductive plate 1016 are enclosed in a case having an opening section only for allowing at least the AC connection cable 1010, the cable connected to the first port 1002, and the cable connected to the second port 17 [sic: 1017] to pass through.

Further, although the Embodiment of the second present invention is shown with the example with two of the first ports 1002 and two of the second ports 1017, the present invention can be implemented in the embodiment with one of the first ports or one of the second ports.

Although the Embodiment of the second present invention is shown with the example in which the first port 1002 is one corresponding to a non-shielded cable, the present invention can be implemented in the embodiment in which the first port is one corresponding to a shielded cable.

Although the Embodiment of the second present invention is shown with the example in which the second port 1017 is one corresponding to a non-shielded cable, the present invention can be implemented in the embodiment in which the second port is one corresponding to a shielded cable or an optical fiber made of such as plastics or glass.

Meanwhile, the size of said control board and said power source board and said electrically conductive plate is preferred to be 50 cm×95 cm [sic: 50 mm×95 mm] or less.

Embodiments of the third present invention are described below with reference to FIGS. 17–21.

(Embodiment 7 )

FIG. 17 shows the external appearance of a lines collection module according to Embodiment 7 of the third present invention. In FIG. 17, (a) is the front view of a lines collection module 2022, (b) is the bottom view thereof , (c) is the rear view thereof , (d) is the side view thereof, numeral 2001 is the first port provided in the front face, 2002 is the second port provided in the rear face, 2003 is a DC (+) supply terminal (DC, below) provided in the bottom face, 2004 is a DC (−) supply terminal (SG, below), 2005 is a frame ground terminal (FG, below), and 2006 is a power source supply terminal provided in the bottom face and comprised of the DC 2003, SG 2004, and FG 2005. A bite claw section 2019 is described later.

A non-shielded cable (connection cable, below) from an informational terminal is connected to the first port 2001, and this connection allows communication according to 10BASE-T or 100BASE-T of IEEE 802 Standard or according to IEEE 1394 Standard.

A non-shielded cable (transition wiring, below) connected to another lines collection device or another informational terminal or similar is connected to the second port 2002.

The power source supply terminal 2006 is provided in the bottom face, and the wiring sequence and location of the DC 2003, SG 2004, and FG 2005 are arbitrary.

Figure 18A:
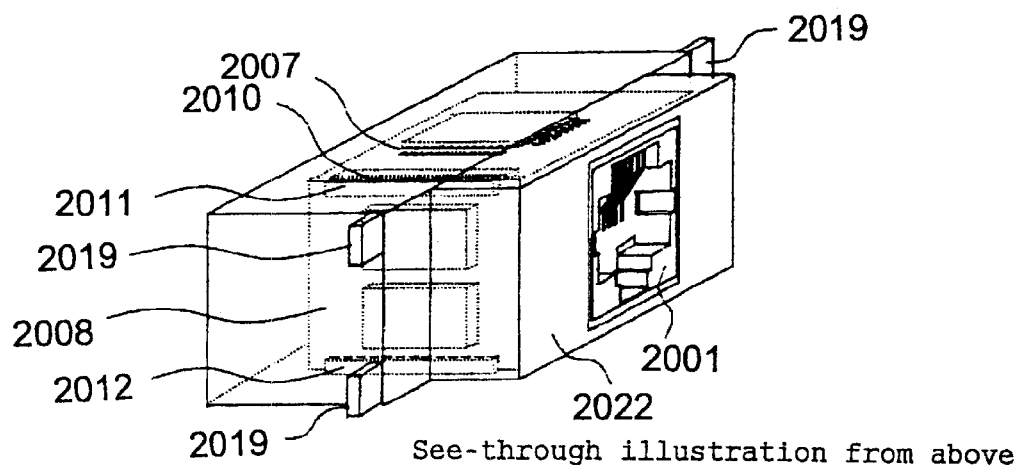
FIG. 18 shows:
(a) a see-through illustration of a lines collection module according to Embodiment 7 of the third present invention viewed from above; and
(b) a see-through illustration of a lines collection module according to Embodiment 7 of the third present invention viewed from below.
Figure 18B:
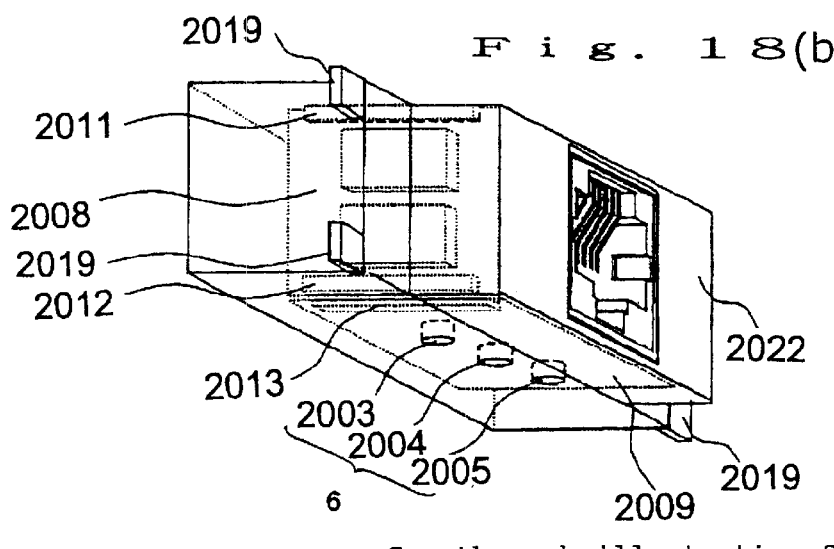

FIG. 18 is a see-through illustration showing the internal structure of a lines collection module according to Embodiment 7 of the third present invention. In FIG. 18, (a) is a see-through illustration viewed from above, (b) is a see-through illustration viewed from below, numeral 2007 is a control board A, 2008 is a control board B, and 2009 is a power source board. The same reference numerals as those in FIG. 17 indicate the similar components to those in FIG. 17.

The control board A 2007 is provided in the top face side of the lines collection module 2022, the control board B 2008 is provided in the side face side, and the power source board 2009 is provided in the bottom face side.

The control board A 2007, control board B 2008 are circuit boards having means for controlling the communication of the first port 2001 and the second port 2002, and is supplied with the required power source by the power source board 2009.

The first port 2001, the second port 2002, control board A 2007, control board B 2008, and power source board 2009 are respectively fixed with resin or similar, and the outer face of the resin forms the shape of the lines collection module shown in FIG. 17.

Since this molding with resin or similar is formed by a material having a good thermal conductivity, the molding yields the effect of releasing the heat produced by the high speed operation of the circuit and components of the control board A 2007 and control board B 2008, and at the same time, the molding results the effect of preventing the failure of the control board A 2007 and control board B 2008 because the molding prevents the entry of water and dust and the like.

Figure 19:
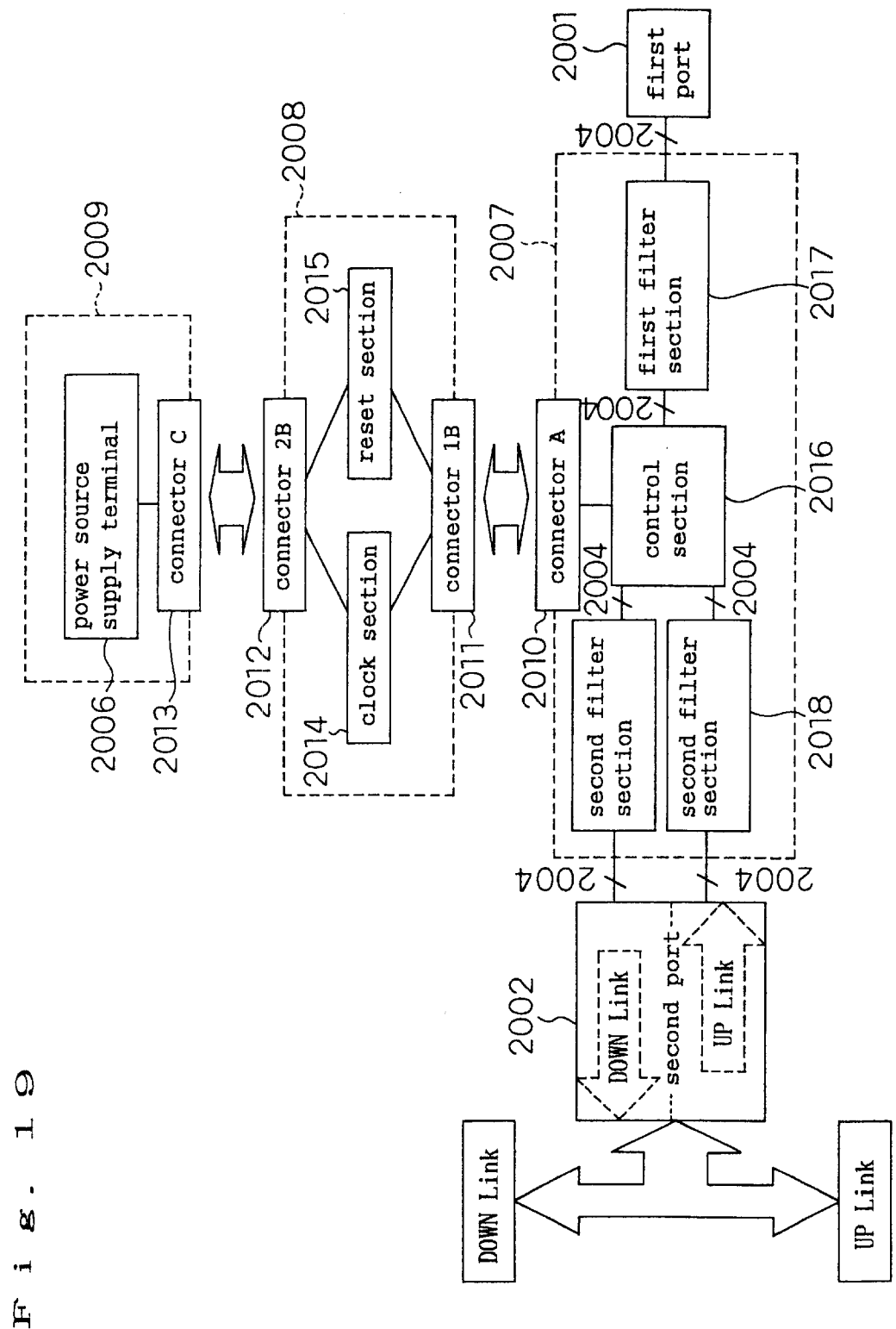
FIG. 19 is a block diagram of a lines collection module according to Embodiment 7 of the third present invention.

FIG. 19 is a block diagram showing the configuration of the lines collection module in Embodiment 7 of the third present invention. In FIG. 19, the control board A 2007 is provided with a connector A 2010, control section 2016, the first filter section 2017, and the second filter section 2018; the control board B 2008 is provided with a connector 1B 2011, a connector 2B 2012, a clock section 2014, and a reset section 2015; the power source board 2009 has a circuit and components for supplying the electricity to the control board B 2008 and control board A 2007, and comprises a connector C 2013 and a power source supply terminal 2006. The same reference numerals as those in FIGS. 17–18 indicate the similar components.

The control board A 2007 and control board B 2008 are interconnected by the connection of the connector A 2010 and connector 1B 2011, and similarly the control board B 2008 and power source board 2009 by the connection of the 2B 2012 and connector C 2013.

Such an configuration is permissible that the first port 2001 and the second port 2002 are directly interconnected electrically, and that the control board A 2007 is removed, and that the power source board 2009 and control board B 2008 are unconnected. This because the control board A 2007 is added to supply the power source if necessary.

The control section 2016 controls the communication between the first port 2001 and the second port 2002, wherein the clock signal to the control section 2016 is supplied from the clock section 2014 of the control board B 2008, and the reset signal is supplied from the reset section 2015 of the control board B 2008.

With regard to the second port, the communication according to 10BASE-T or 100BASE-T or IEEE 1394 uses 8-pin connectors but uses only four pins thereof in the actual communication according to the standard, and accordingly, the second port is provided with an 8-pin jack connector having four pins used by the UP link cable and another four pins used by the DOWN link cable together in one so that two communication paths can be connected to the second port. The connection is made so that the DOWN link and UP link become twisted pairs.

The first filter section 2017 and the second filter section 2018, for example, conduct the treatment of reducing the electric signal noise flowing in the control section 2016 and the first port 2001 or in the second port 2002 and control section 16 [sic: 2016]; and conduct the treatment of electrically isolating the first filter port 2001 and the second port 2002 and control section 2016 and the like; and are provided in the control board A 2007 and control board B 2008

Figure 20:
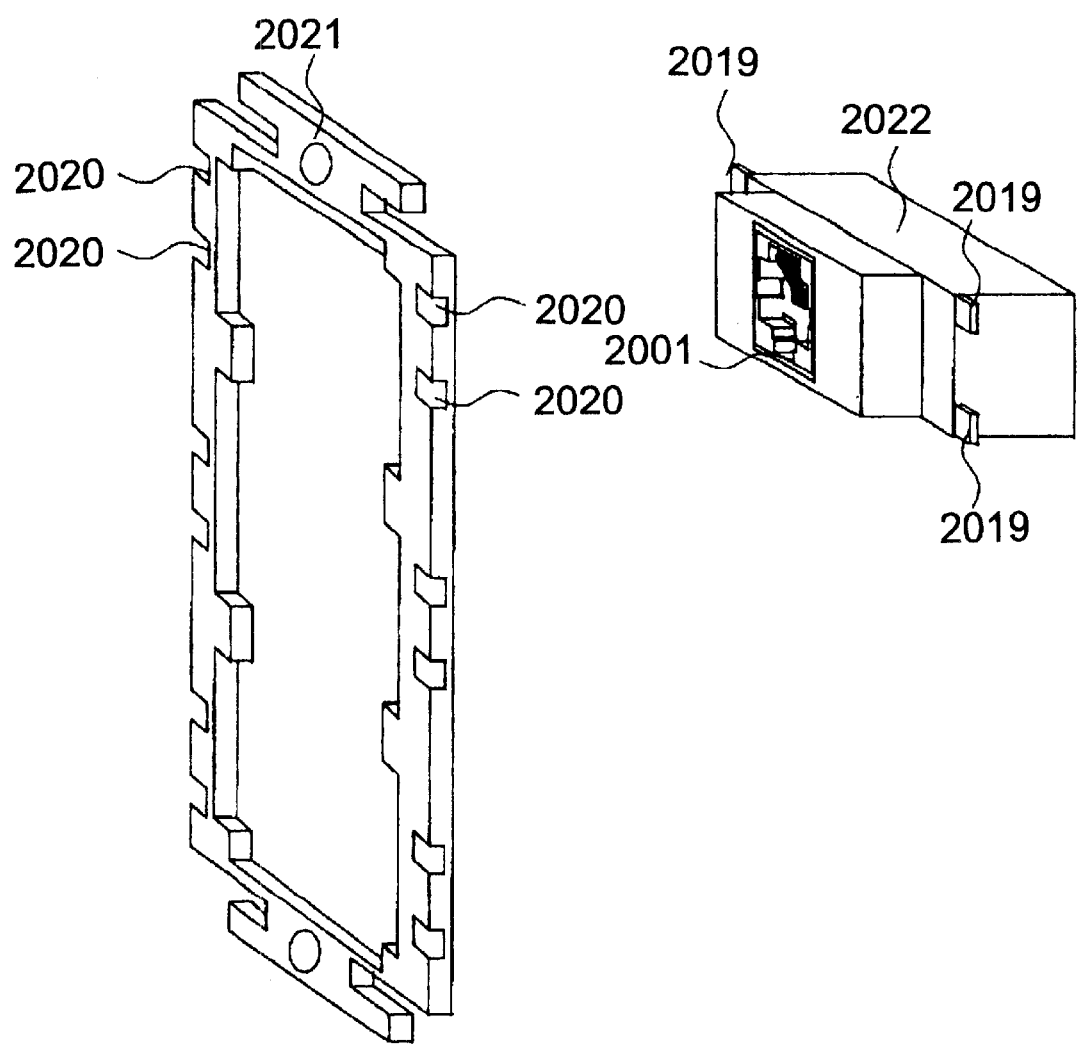
FIG. 20 is an illustration of the attachment structure of a lines collection module according to Embodiment 7 of the third present invention.

FIG. 20 shows the attachment structure of a lines collection module according to Embodiment 1 of the third present invention, and in FIG. 20, numeral 2019 is a bite claw section, 2020 is a bitten claw section, 2021 is an attachment frame, and 2022 is a lines collection module.

The attachment structure of the lines collection module mentioned above is described below.

The attachment frame 2021 is a commercial one and provided with the bitten claw sections 2020 for attaching a module such as a commercial-line AC power source outlet and a power source switch or the like, whereby three modules can be attached.

The lines collection module 2022 of the third present invention is provided with the bite claw sections 2019 for mating with the bitten claw sections 2020 of the attachment frame 2021 for attaching the lines collection module 2022.

Since the dimension of the lines collection module 2022 is 22 mm length×45 mm width×40 mm depth or less, three modules can be attached to the attachment frame 2021.

Figure 21:
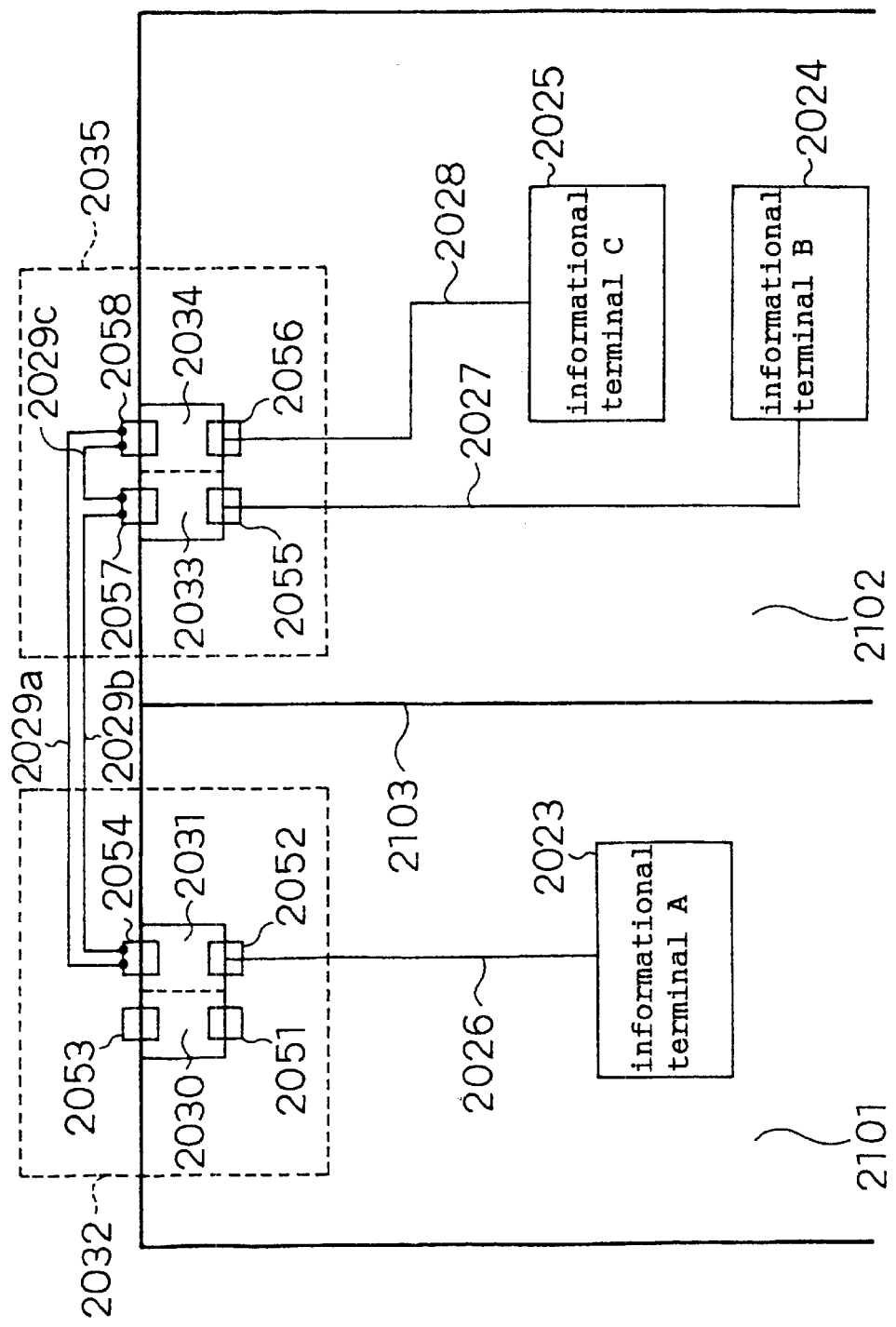
FIG. 21 is an illustration of usage of a lines collection module according to Embodiment 7 of the third present invention.

FIG. 21 shows an example of usage of a lines collection module according to Embodiment 7 of the third present invention. In FIG. 21, numeral 2026 is a connection cable A, 2027 is a connection cable B, 2028 is a connection cable C, 2029a, 2029b, 2029c are transition wiring, 2030 is a lines collection module 1A, 2031 is a lines collection module 2A, 2032 is an informational outlet A, 2033 is a lines collection module 1B, 2034 is a lines collection module 2B, 2035 is an informational outlet B, 2051, 2052, 2055, 2056 are the first ports, 2053, 2054, 2057, 2058 are the second ports, 2101 is a room A, 2102 is a room B, and 2103 is a wall.

In the usage of the lines collection module with the configuration mentioned above, the operation thereof is described below.

The informational outlet A 2032 is constructed with: the lines collection module 1A 2030 having the first port 2051 and the second port 2053; and the lines collection module 2A 2031 having the first port 2052 and the second port 2054.

The informational outlet B 2035 is constructed with: the lines collection module 1B 2033 having the first port 2055 and the second port 2057; and the lines collection module 2B 2034 having the first port 2056 and the second port 2058.

FIG. 21 shows an example of usage in which each of the informational outlets is provided with two of the lines collection modules according to Embodiment 7 of the third present invention.

The informational terminal A 2023 located in the room A 2101 is connected to the first port 2052 of the lines collection module 2A 2031 of the informational outlet A 2032 via the connection cable A 2026, and the informational terminal B 2024 located in the room B 2102 is connected to the first port 2055 of the lines collection module 1B 2033 of the informational outlet B 2035 via the connection cable B 2027, and further the informational terminal C 2025 is connected to the first port 2056 of the lines collection module 2B 2034 via the connection cable C 2028.

The lines collection module 2A 2031 of the informational outlet A 2032 and the lines collection module 1B 2033, lines collection module 2B 2034 both of the informational outlet B 2035 are interconnected by the transition wiring 2029a, 2029b, and 2029c. That is, the transition wiring 2029a connects the UP link of the port 2054 and the DOWN link of the port 2058, and the transition wiring 2029a [sic: 2029b] connects the UP link of the port 2054 and the DOWN link of the port 2058, and further the transition wiring 2029b [sic: 2029c] connects the UP link of the port 2057 and the DOWN link of the port 2054.

Usage in the configuration above is described. The informational terminal A 2023 can communicate with the informational terminal B 2024 and informational terminal C 2025 located in another room, and even when any of the informational terminal A 2023, informational terminal B 2024, and informational terminal C 2025 changes the room, it can communicate with other informational terminals only by connecting to one of the lines collection modules located in the informational outlets in the respective rooms.

Although the description above was made in the example in which the control board A 2007 was provided in the top face side of the lines collection module 2022 and in which the power source board 2009 in the bottom face side and further in which the power source supply terminal 2006 in the bottom face side, the present invention can be similarly implemented in another configuration, for example, in which the control board A 2007 is provided in the bottom face side and in which the power source board 2009 in the top face side and further in which the power source supply terminal 2006 in the top face side.

Further, although the example with the three separate boards was shown, they can be integrated into one board by component miniaturization and high density assembling.

Although the description above was made in the example in which the connection cable connected to the first port 2001 and the connection cable connected to the second port 2002 were non-shielded cables, the present invention can be similarly implemented with other shielded cables.

The shield of the shielded cable has a contact point at the mating section with the connector, and has the contact structure in which the shells and the shield of the shielded cable are electrically contacted by the action that the shield contacts to the shells provided in the mating sections of the first port 2001 and the second port 2002 when the shielded cable is connected to the first port 2001 and the second port 2002; and further, the shells of the first port and the second port are electrically connected to the FG 2005.

Although the description above was made in the example in which the first port 2001, the second port 2002, control board A 2007, control board B 2008, power source board 2009, and power source supply terminal 2006 have a shape formed by molding with resin or similar, it is also permissible to form it by putting the first port 2001, the second port 2002, control board A 2007, control board B 2008, power source board 2009, and power source supply terminal 2006 in an electrically conductive case having at least an opening section allowing the access to the power source supply terminal 2006 and by enclosing the surrounding of the case with resin or similar.

Said electrically conductive case can be electrically connected to the FG 2005 of the power source supply terminal 2006. In that instance, since the control board A 2007 and control board B 2008 are contained in the electrically conductive case and since the electrically conductive case is connected to the FG 2005, the electrically conductive case works as an electrostatic shield and has the effect of preventing the malfunction due to noise.

Industrial Feasibility

As is obvious by the description above, according to the first present invention, it can be easily treated without rewiring work, even if change the communication method, and the equipment can be of wall built-in and of simple design, and further, users can assuredly use it in the same sense as that of the life lines.

The second present invention yields the prominent effect of providing an active informational outlet allowing the construction of noise tolerant network environment using a small amount of equipment and having orderly wiring.

A lines collection module and an informational outlet according to the third present invention yield the prominent effect that the communication between informational terminals located in different rooms is allowed using inexpensive wiring that does not spoil the beauty.

What is claimed is:

1. An informational outlet, comprising:

an outlet frame body having a wiring holder for connecting the informational wiring installed in a wall face; and an information exchange section having the first connector provided in the room side for connecting the informational wiring of an informational terminal, and for performing the transit, exchange, or processing of information between the informational wiring in the wall face and said informational wiring of said informational terminal;

wherein said information exchange section is structurally freely attachable to and detachable from said outlet frame body, said outlet frame body having the second connector connected to said wiring holder, said information exchange section having the third connector correspondingly connected to the second connector, and said outlet frame body being provided with ejection means used for ejecting said information exchange section from said outlet frame body.

2. An informational outlet according to claim 1, wherein said ejection means utilizes the leverage mechanism.

3. An informational outlet, comprising:

an outlet frame body having a wiring holder for connecting the informational wiring installed in a wall face;

an information exchange section having the first connector provided in the room side for connecting the informational wiring of an informational terminal, and for performing the transit, exchange, or processing of information between the informational wiring in the wall face and said informational wiring of said informational terminal; and a shielding and opening mechanism for shielding and opening so that said electricity supply section is shielded when said information exchange section is installed into said outlet frame body and so that said electricity supply section is opened toward said information exchange section side when said information exchange section is removed from said outlet frame body.

4. An informational outlet according to claim 3, wherein said shielding and opening mechanism and said ejection means work in linkage.

5. An informational outlet according to claim 1, comprising a shielding and opening mechanism for shielding and opening so that said electricity supply section is shielded when said information exchange section is installed into said outlet frame body and so that said electricity supply section is opened toward said information exchange section side when said information exchange section is removed from said outlet frame body.

6. An informational outlet according to claim 3 [sic: 42], wherein said shielding and opening mechanism and said ejection means work in linkage.

7. An active informational outlet received in a permanent wall of a room comprising:

a frame body having a rear-side extending within the wall and a front-side facing the room;

a connector disposed within the rear-side for mating with informational wiring extending within walls of the room;

a removable information exchange section, insertable only from the front-side for electrically connecting to the connector, including:

least one receptacle for receiving a cable from the room, the cable carrying information, and a resident controller for actively controlling transfer and selection of the information between the cable in the room and the informational wiring in the wall;

the front-side including an opening sufficiently large to insert only from the front-side the information exchange section to releasably engage the connector and permit removal of the information exchange section only through the opening in the front-side; and an ejector tab mechanically coupled to the information exchange section for removing the information exchange section from the frame body when actuated.

8. The active informational outlet of claim 7 wherein the ejector tab is formed from one end of a rod, the one end protruding forwardly of the front-side of the frame body, and the other end of the rod abutting a rotatable lever, the rotatable lever fixed to the frame body within the rear-side, and adjacent to the information exchange section, wherein when the ejector tab is pushed toward the rear-side, the rotatable lever rotates to eject the information exchange section.

* * * * *